US012623311B1

(12) United States Patent
Zhou et al.

(10) Patent No.: US 12,623,311 B1
(45) Date of Patent: May 12, 2026

(54) HEAT EXCHANGER PRODUCTION LINE

(71) Applicants:QINGDAO HISENSE HITACHI AIR-CONDITIONING SYSTEMS CO., LTD., Shandong (CN); QINGDAO UNIVERSITY OF TECHNOLOGY, Shandong (CN)

(72) Inventors: Zhigang Zhou, Qingdao (CN); Yudi Fei, Qingdao (CN); Hu Li, Qingdao (CN); Changhe Li, Qingdao (CN); Yuewen Feng, Qingdao (CN); Ming Li, Qingdao (CN); Wanshuai Xu, Qingdao (CN); Xiao Ma, Qingdao (CN); Bei Liu, Qingdao (CN); Benkai Li, Qingdao (CN); Rui Zhang, Qingdao (CN); Mingzheng Liu, Qingdao (CN); Tinghong Xu, Qingdao (CN); Yanbin Zhang, Qingdao (CN)

(73) Assignees: QINGDAO HISENSE HITACHI AIR-CONDITIONING SYSTEMS CO., LTD., Shandong (CN); QINGDAO UNIVERSITY OF TECHNOLOGY, Shandong (CN)

( * ) Notice: Subject to any disclaimer, the term of this patent is extended or adjusted under 35 U.S.C. 154(b) by 0 days.

(21) Appl. No.: 19/347,689

(22) Filed: Oct. 1, 2025

(30) Foreign Application Priority Data

Mar. 27, 2025 (CN) .......................... 202510378193.2

(51) Int. Cl.
*B23P 15/26* (2006.01)

(52) U.S. Cl.
CPC .................................... *B23P 15/26* (2013.01)

(58) Field of Classification Search
CPC ......... B23P 15/26; B23P 19/00; B23P 19/001; B23P 19/10; B21D 53/02; F28D 1/05366; Y10T 29/4935
See application file for complete search history.

(56) References Cited

FOREIGN PATENT DOCUMENTS

| CN | 104227366 | | 6/2016 |
|----|-----------|---|--------|
| CN | 212946377 | | 4/2021 |
| CN | 212946377 U | * | 4/2021 |

* cited by examiner

*Primary Examiner* — Jason L Vaughan
*Assistant Examiner* — Amanda Kreiling
(74) *Attorney, Agent, or Firm* — JCIPRNET

(57) ABSTRACT

A heat exchanger production line is provided, which includes a support frame, a fin conveying line, as well as a fin storing-fetching device, an end plate mounting device, a pipe inserting device and a nitrogen charging device which are arranged at corresponding positions of the fin conveying line. The fin storing-fetching device is arranged at one end of the fin conveying line. The fin storing-fetching device includes a storing-fetching bracket, a bottom plate, a lifting support plate and a feeding robot. A fin stack is transferred to the fin conveying line by the fin storing-fetching device, is then sequentially conveyed to corresponding stations to be processed along with the fin conveying line, ultimately forming a heat exchanger.

18 Claims, 26 Drawing Sheets

430

432

450

452

4513

4512          451

4511

A

611

612

64

6143

6142

6141

614

613

4503

4501

4502

4503

7332

7333

7331

733

C-C

711

720

HEAT EXCHANGER PRODUCTION LINE

CROSS-REFERENCE TO RELATED APPLICATION

This application claims the priority benefit of China application serial no. 202510378193.2, filed on Mar. 27, 2025. The entirety of the above-mentioned patent application is hereby incorporated by reference herein and made a part of this specification.

BACKGROUND

Technical Field

The present application relates to the field of air conditioning manufacturing technologies, and particularly relates to a heat exchanger production line.

Description of Related Art

In the air conditioning industry, heat exchangers refer to evaporators and condensers, which play the roles of evaporation, heat dissipation, and heat exchange. They are important components of cooling systems.

A manufacturing process of the heat exchanger includes various working procedures such as copper pipe insertion, nitrogen charging, and welding. In general, a worker transfers a fin stack stored in a buffer region to corresponding work station by using a material conveying vehicle for manual pipe insertion, nitrogen charging, welding, and other working procedures. Every time one heat exchanger is processed, the worker needs to bend down to take and lift the fin stack, and a large amount of invalid transferring carrying exists in this process, so that a production efficiency is greatly reduced, and manpower labor intensity is high.

SUMMARY

Some embodiments of the present application provide a heat exchanger production line to solve the problems that in the related art, when a heat exchanger is processed and transported among different stations, a manpower dependence degree is excessively high, mechanical and intelligent degrees are low, and a labor cost is high.

Some embodiments of the present application provide a heat exchanger production line, including:

a support frame;

a fin conveying line mounted on the support frame, where at least a fin storing-fetching station, an end plate mounting station, a pipe inserting station, and a nitrogen charging station are arranged along a conveying direction of the fin conveying line;

a fin storing-fetching device located at one end of the fin conveying line, and the fin storing-fetching device includes:

a storing-fetching bracket having a storage space formed therein;

a bottom plate horizontally arranged in the storage space of the storing-fetching bracket, where the bottom plate includes a plurality of fin stacking pins vertically arranged on the bottom plate, and a first end of each fin stacking pin is fixed on the bottom plate;

a lifting support plate arranged parallel to and above the bottom plate, where the lifting support is configured to reciprocate along a height direction of the storing-fetching bracket; a plurality of through holes are formed in the lifting support plate, the plurality of fin stacking pins respectively pass through the plurality of through holes, and a second end of each fin stacking pin extends out of a side of the lifting support plate away from the bottom plate, where each fin stacking pin is configured such that: when a plurality of fins fall into the storage space, the second end of the fin stacking pin is inserted into an insertion hole of a corresponding fin, where the fins strung in series by fin stacking pin form one fin stack; and a feeding robot configured to transfer the fin stack from the lifting support plate to the fin storing-fetching station when the lifting support plate lifts the fin stack to a target height; and the feeding robot includes:

a feeding robot body; and a feeding clamp arranged on the feeding robot body, where the feeding clamp includes: a clamping power member, and a first feeding clamping member and a second feeding clamping member that are symmetrically arranged; the clamping power member is configured to control a distance between the first feeding clamping member and the second feeding clamping member; where the first feeding clamping member includes a first feeding clamping jaw, the second feeding clamping member includes a second feeding clamping jaw, a first positioning recess with an opening facing the second feeding clamping jaw is formed on the first feeding clamping jaw, a second positioning recess with an opening facing the first feeding clamping jaw is formed on the second feeding clamping jaw; when first feeding clamping jaw and the second feeding clamping jaw clamp the fin stack under an action of the clamping power member, two ends of a positioning pin inserted in the fin stack are respectively inserted into the first positioning recess and the second positioning recess; where the positioning pin is inserted into an insertion port of each fin in the fin stack by a positioning pin inserting robot after the fin stack is formed; after the positioning pin passes through the insertion port of each fin in the fin stack, a first end of the positioning pin is supported on the lifting support plate, and a second end of the positioning pin is exposed above the fin stack, so that the first end of the positioning pin and the second end of the positioning pin are capable of being clamped in the first positioning recess and the second positioning recess, respectively;

an end plate mounting device corresponding to the end plate mounting position, where the end plate mounting device is configured to mount end plate members to both ends of the fin stack after the fin conveying line conveys the fin stack from the fin storing-fetching station to the end plate mounting station; where the end plate mounting device includes at least two end plate mounting robots, which are symmetrically arranged on both sides of the fin conveying line, and each end plate mounting robot includes:

an end plate mounting robot body;

a connecting beam mounted on the end plate mounting robot body, where a clamping power member is provided in the connecting beam, and a first telescopic end and a second telescopic end are formed on two ends of the clamping power member, respectively;

two end plate clamps respectively provided on the first telescopic end and the second telescopic end, where the two end plate clamps are configured to move towards or away from each other under an action of the clamping power member to clamp or release the end plate member; and a pushing member mounted on the connecting beam, where the pushing member is configured to push the end plate member clamped in the end plate clamps to mount the end plate member to the fin stack;

a pipe inserting device corresponding to the pipe inserting station, where the pipe inserting device includes a pipe inserting robot, the pipe inserting robot is configured to insert a pipe member into the fin stack after the end plate member is mounted and the fin conveying line conveys the fin stack to the pipe inserting station; where the pipe inserting robot includes a pipe inserting robot body and a pipe inserting clamp, the pipe inserting clamp is connected to the pipe inserting robot body and includes two spaced pipe inserting assemblies; each of the pipe inserting assemblies includes a middle connecting portion and at least one pipe gripper arranged on the middle connecting portion; the pipe inserting device grips the pipe member through the pipe gripper and inserts the pipe member into the fin stack under driving of the pipe inserting robot body; and a nitrogen charging device corresponding to the nitrogen charging station, where the nitrogen charging device includes a nitrogen charging apparatus, a nitrogen charging docking member, and a nitrogen charging robot, where the nitrogen charging robot is configured to clamp the nitrogen charging docking member to dock the nitrogen charging docking member with the pipe member of the fin stack, and the nitrogen charging apparatus charges nitrogen into the pipe member through the nitrogen charging docking member.

The heat exchanger production line provided in the present application includes a fin conveying line. Along the fin conveying line, at least a fin storing-fetching station, an end plate mounting station, a pipe inserting station, and a nitrogen charging station are set up according to the processing steps of the heat exchanger. The fin stacks are transferred to the fin conveying line by the fin storing-fetching device and then conveyed sequentially to the corresponding stations for processing, ultimately forming the heat exchanger. The various processing equipment on the production line work in coordination, reducing material transfer processes during heat exchanger production, and improving production efficiency.

Additionally, at the fin storing-fetching station, the fin stack is placed on the lifting support plate using fin stacking pins and positioning pins. When the fin stack is completed, the lifting support plate raises the fin stack along with the positioning pins. The fin stack is then grasped by a feeding robot and placed onto the fin conveying line. This approach helps maintain the integrity of the fin stack, reducing issues such as displacement or misalignment of the fins within the fin stack, while achieving a higher degree of mechanization and automation.

After reading of specific implementations of the present application with reference to the accompanying drawings, other characteristics and advantages of the present application will become more apparent.

BRIEF DESCRIPTION OF THE DRAWINGS

In order to illustrate the technical solutions in the embodiments of the present application or the related art more clearly, the drawings required for describing the embodiments or the related art will be described briefly. Apparently, the following described drawings are for some embodiments of the present application, and other drawings can be derived from these drawings by those of ordinary skill in the art without any creative effort.

DESCRIPTION OF THE EMBODIMENTS

Figure 1:
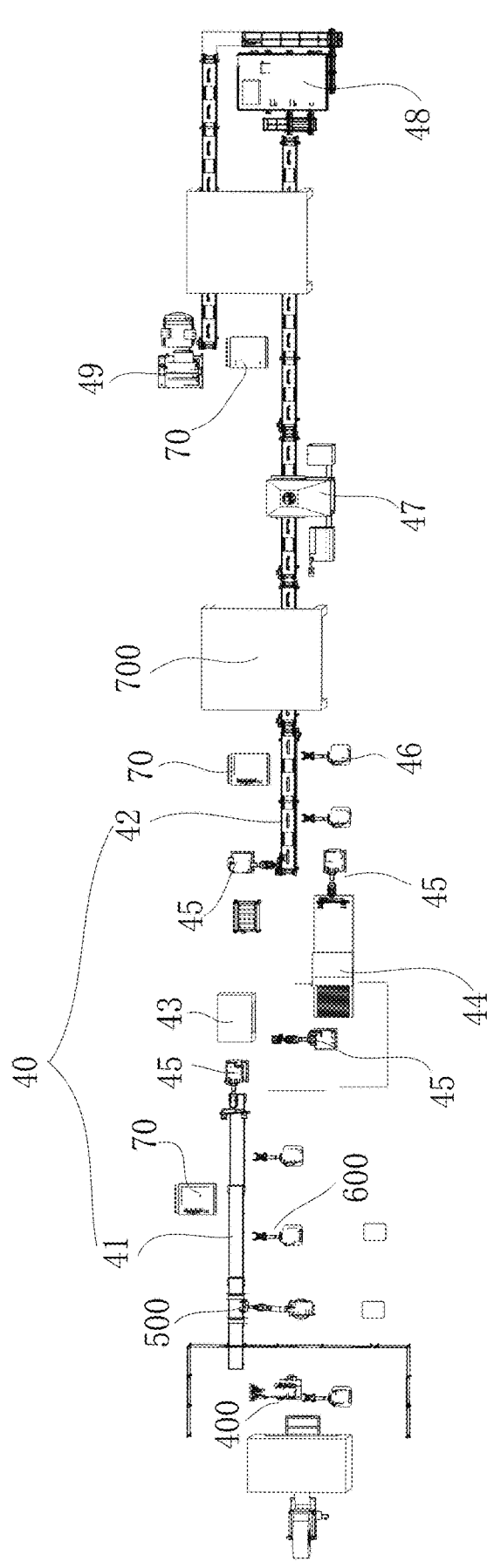
FIG. 1 is a schematic diagram of a heat exchanger production line according to some embodiments.

The technical solutions in the embodiments of the present application are clearly and completely described with reference to the accompanying drawings in the embodiments of the present application, and apparently, the described embodiments are not all but only a part of the embodiments of the present application. All other embodiments obtained by a person of ordinary skill in the art based on the embodiments of the present application without creative efforts shall fall within the protection scope of the present application.

In descriptions of the present application, it should be understood that, directions or positional relationships indicated by terms "center", "upper", "lower", "front", "rear", "left", "right", "vertical", "horizontal", "top", "bottom", "inner", "outer", etc. are based on orientations or positional relationships shown in the accompanying drawings, and they are used only for describing the present application and for description simplicity, but do not indicate or imply that an indicated apparatus or element must have a specific orientation or be constructed and operated in a specific orientation. Therefore, it cannot be understood as a limitation on the present application.

The terms such as "first" and "second" are used herein for purposes of description and are not intended to indicate or imply relative importance or significance or to imply the number of indicated technical features. Thus, the feature defined with "first" and "second" may include one or more of this feature explicitly or implicitly. In the description of the present application, "a plurality of" means two or more unless otherwise stated.

In the description of the present application, it should be noted that unless specified or limited otherwise, the terms "mounted", "connected", and "coupled" and the like are used broadly, and may be, for example, fixed connections, detachable connections, or integral connections; may also be mechanical or electrical connections; may also be direct connections or indirect connections via intervening structures; may also be inner communications of two elements. The above terms can be understood by those skilled in the art according to specific situations.

In the present application, unless specified or limited otherwise, a structure in which a first feature is "on" or "below" a second feature may include an embodiment in which the first feature is in direct contact with the second feature, and may also include an embodiment in which the first feature and the second feature are not in direct contact but are contacted via an additional feature formed therebetween. Furthermore, a first feature "on," "above," or "on top of" a second feature may include an embodiment in which the first feature is right and obliquely "on," "above," or "on top of" the second feature, or just means that the first feature is at a height higher than that of the second feature. while a first feature "below," "under," or "on bottom of" a second feature may include an embodiment in which the first feature is right and obliquely "below," "under," or "on bottom of" the second feature, or just means that the first feature is at a height lower than that of the second feature.

The following disclosure provides many different embodiments or examples for implementing different features of the present application. In order to simplify the disclosure of the present application, components and arrangements of specific examples are described below. Certainly, they are merely examples and are not intended to limit the present application. In addition, the present application may repeat reference numerals and/or reference letters in different examples, which is for the purposes of simplicity and clarity and does not indicate a relationship between the various discussed implementations and/or configurations. In addition, the present application provides examples of various specific processes and materials, but one of ordinary skill in the art may recognize the application of other processes and/or the use of other materials.

Referring to FIG. 1, some embodiments of the present application provide a heat exchanger production line including a support frame 50, a fin conveying line 40, and a plurality of processing devices arranged along a conveying direction of the fin conveying line 40.

The fin conveying line 40 is mounted on the support frame 50. At least a fin storing-fetching station, an end plate mounting station, a pipe inserting station, and a nitrogen charging station are arranged along the conveying direction of the fin conveying line 40.

The processing devices include a fin storing-fetching device 400 corresponding to the fin storing-fetching station, an end plate mounting device 500 corresponding to the end plate mounting station, a pipe inserting device 600 corresponding to the pipe inserting station, and a nitrogen charging device 700 corresponding to the nitrogen charging station.

Figure 9:
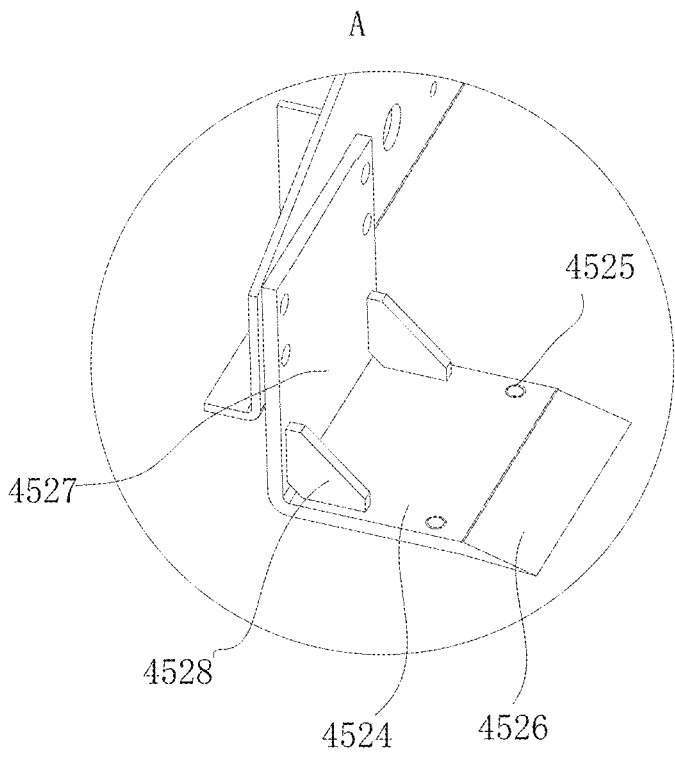
FIG. 9 is an enlarged view at A in FIG. 8.

Referring to FIG. 9, the fin conveying line 40 includes an upstream conveying line 41 and a downstream conveying line 42. The upstream conveying line 41 includes a plurality of rollers 4101 arranged at intervals along a conveying direction of the upstream conveying line 41, each roller 4101 is connected to a motor, and the rollers 4101 are driven by the motor to roll, so as to convey a fin stack 60.

The downstream conveying line 42 includes a conveying driving member and a conveying belt, and the conveying belt is driven by the conveying driving member to move to convey the fin stack 60 among the stations. When the fin stack 60 is conveyed to the corresponding processing station, the conveying driving member is turned off. After work corresponding to the processing station is finished, the conveying driving member is restarted, and conveyance to the next station continues.

The fin storing-fetching device 400 is arranged at an end portion of the fin conveying line 40 and configured to transfer the fin stack 60 formed by fins machined and formed by an aluminum sheet uncoiler and a fin stamping press onto the fin conveying line 40. The fin stack 60 is subjected to various subsequent working procedures to form a heat exchanger or an evaporator.

The end plate mounting station and the pipe inserting station are located on the upstream conveying line 41, and the nitrogen charging station is located on the downstream conveying line 42.

A pipe expanding device 43 and a drying device 44 are arranged between the upstream conveying line 41 and the downstream conveying line 42. The fin stack 60 is conveyed between the upstream conveying line 41 and the pipe expanding device 43, between the pipe expanding device 43 and the drying device 44, and between the drying device 44 and the downstream conveying line 42 by a transfer robot 45.

The downstream conveying line 42 is further provided with a pipe bending station, a welding station and a helium charging station. The pipe bending station is arranged upstream of the nitrogen charging station, and the welding station and the helium charging station are sequentially arranged downstream of the nitrogen charging station along a conveying direction of the downstream conveying line 42.

The downstream conveying line 42 is controlled to be started and stopped by the conveying driving member, so that positions of the stations need to meet the following requirements: a corresponding processing operation may be performed at each station when the conveying driving member is turned off, and the corresponding fin stack 60 is synchronously conveyed to the next processing station when the conveying driving member is turned on for conveyance.

The involved processing devices are explained in detail below.

Figure 2:
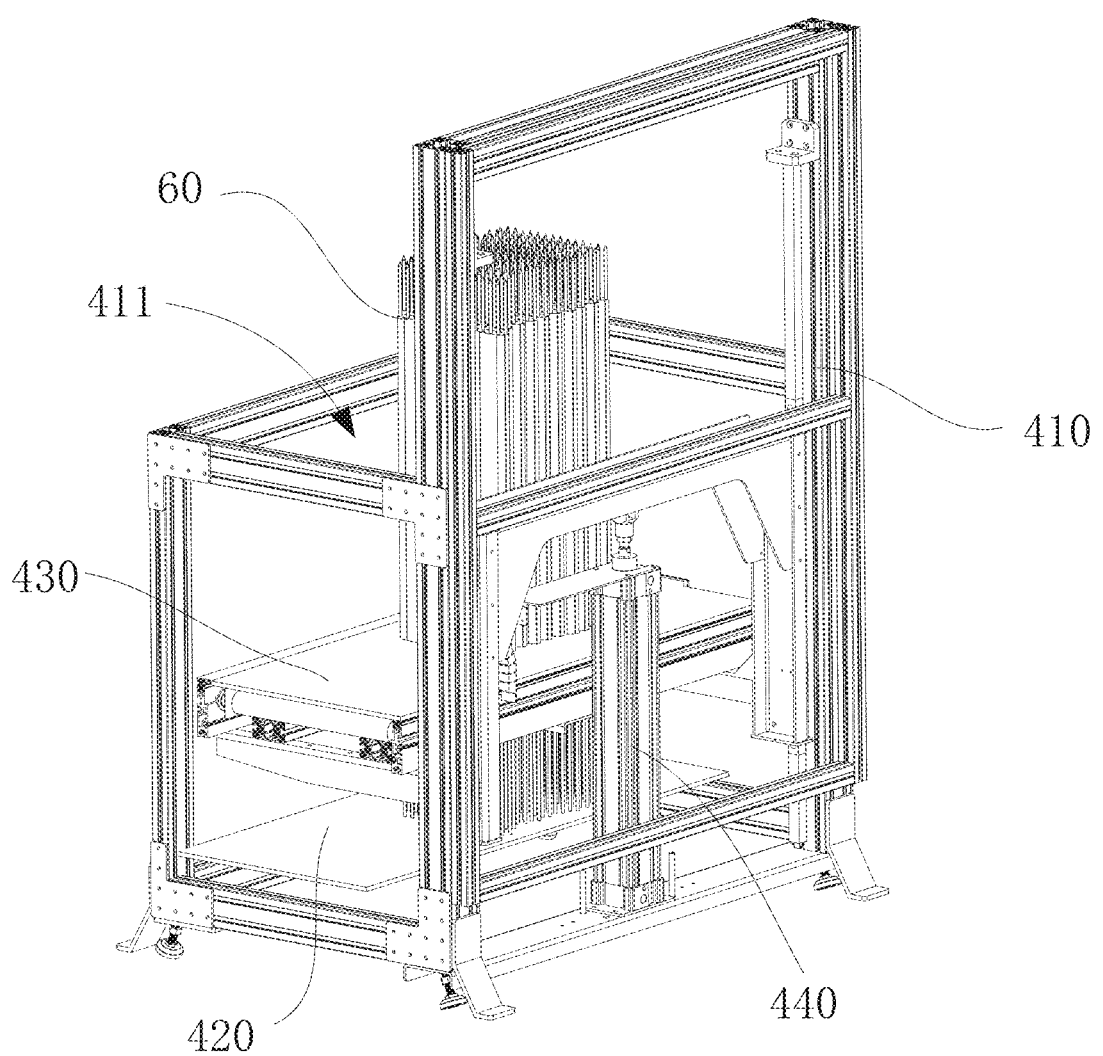
FIG. 2 is a partial structural view of a fin storing-fetching device according to some embodiments.
Figure 3:
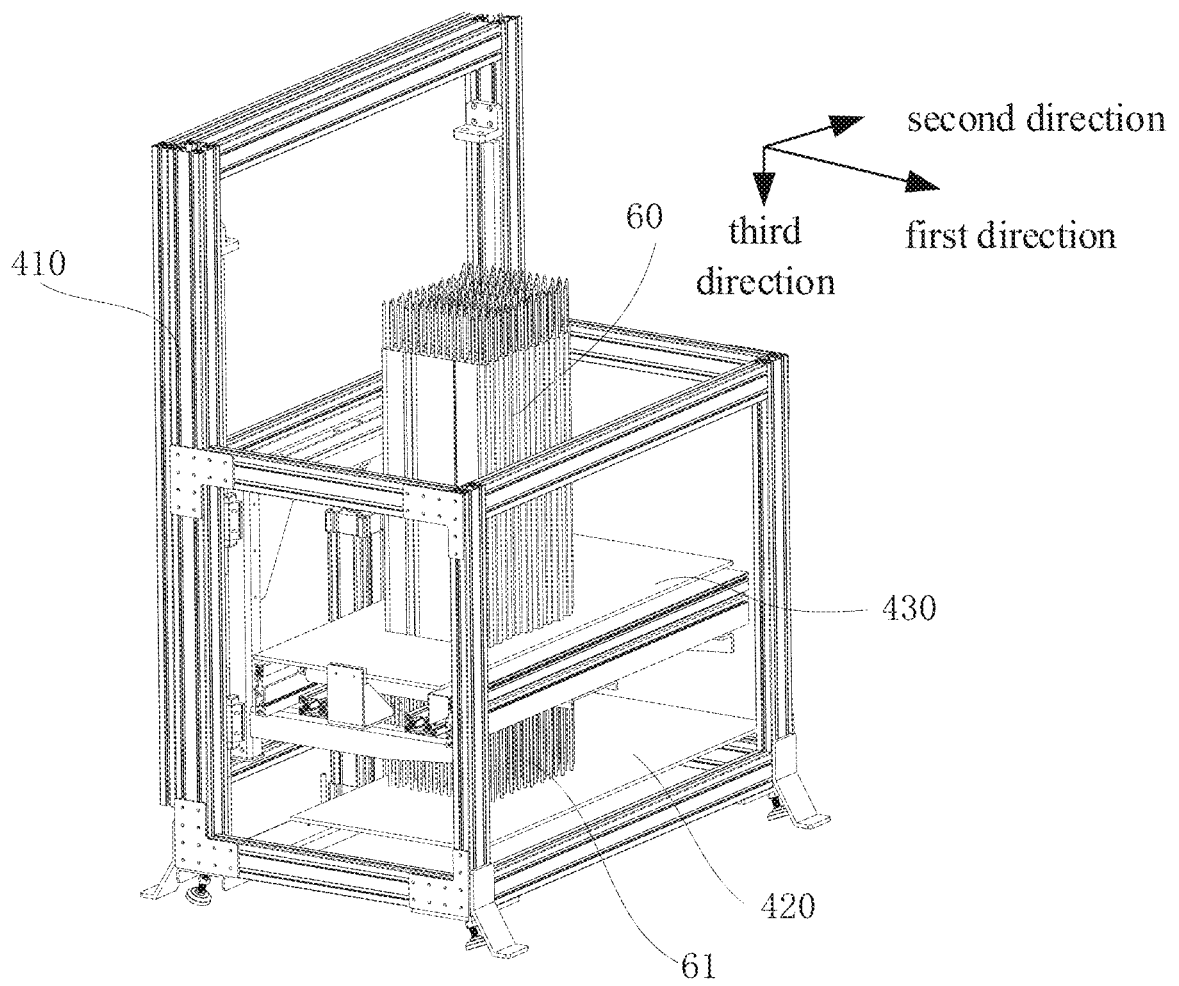
FIG. 3 is a schematic diagram showing a position of a lifting support plate in a material storing state according to some embodiments.
Figure 4:
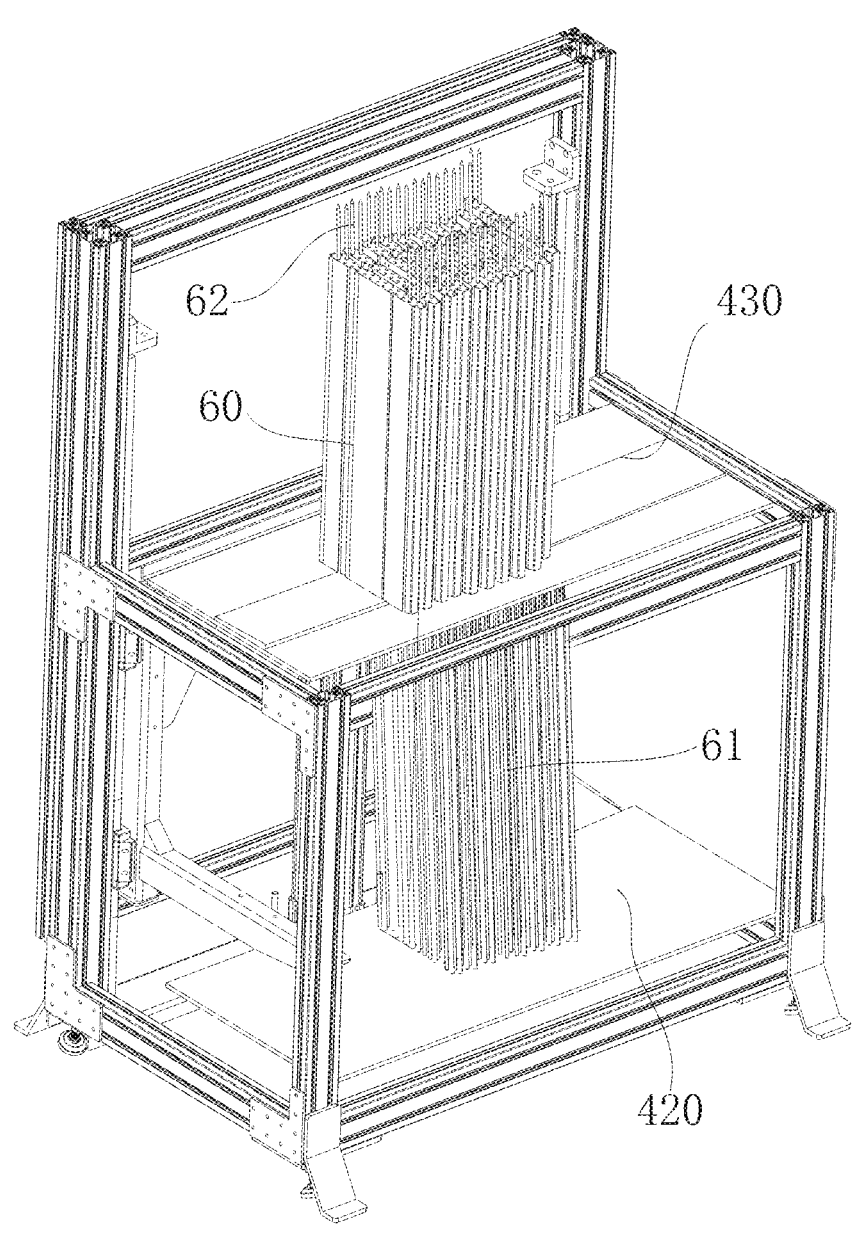
FIG. 4 is a schematic diagram showing a position of the lifting support plate in a material fetching state according to some embodiments.
Figure 5:
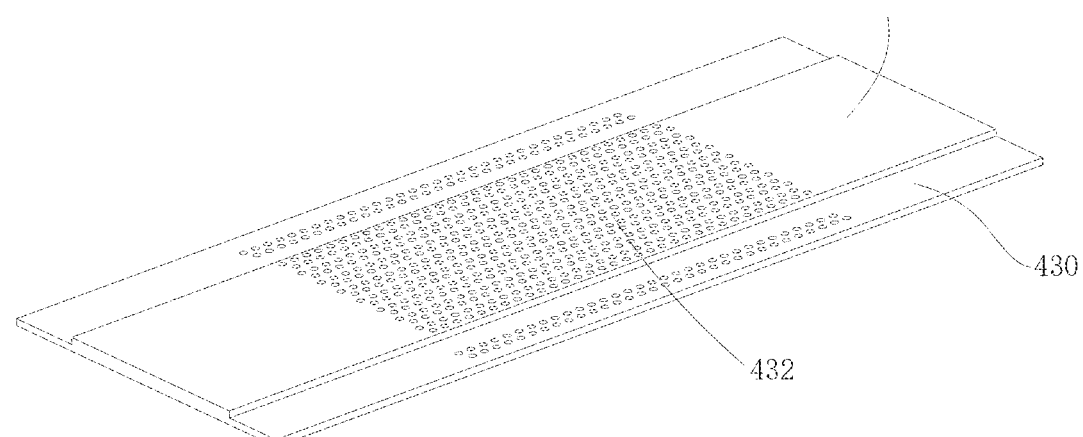
FIG. 5 is a structural view of the lifting support plate according to some embodiments.

Referring to FIG. 2 to FIG. 4, the fin storing-fetching device 400 includes a storing-fetching bracket 410. The storing-fetching bracket 410 has a frame structure having a storage space formed therein. The storage space is configured for accommodating fin stacks 60.

Exemplarily, as shown in FIG. 2, the storing-fetching bracket 410 is generally cuboid in shape. In the following description, the bottom of the storing-fetching bracket 410 refers to the side facing the ground during use, and the top of the storing-fetching bracket 410 refers to the side opposite to the bottom. The direction from the top to the bottom of the storing-fetching bracket 410 is the height direction of the storing-fetching bracket 410.

The fin storing-fetching device 400 further includes a bottom plate 420. The bottom plate 420 is arranged horizontally on the storing-fetching bracket 410, and exemplarily, located at the bottom of the storage space formed in the storing-fetching bracket 410.

The bottom plate 420 is vertically provided with a plurality of fin stacking pins 61, the bottom of each fin stacking pin 61 is fixed on the bottom plate 420, and the top of each fin stacking pin 61 extends vertically upward. The fin stacking pin 61 is configured to position the fin which is discharged into the storage space after being processed and formed.

Referring to FIG. 3, in the usage state, when a fin is placed in the fin storing-fetching device 400, a length direction of the fin is defined as a first direction, a width direction of the fin is defined as a second direction, and a thickness direction of the fin is defined as a third direction. A plurality of fin stacks 60 are formed by the fins in the storage spaces along the second direction, and each fin stack 60 includes a plurality of fins stacked on the fin stacking pin 61 along the third direction. The third direction is the height direction of the storing-fetching bracket 410.

The fin storing-fetching device 400 further includes a lifting support plate 430. The lifting support plate 430 is arranged above the bottom plate 420 in parallel and movably connected to the storing-fetching bracket 410 along the third direction. The lifting support plate 430 can reciprocate along the height direction of the storing-fetching bracket 410. A plurality of through holes 432 are formed in the lifting support plate 430. The through holes 432 are configured for the fin stacking pins 61 to pass through.

It can be understood that the plurality of fin stacking pins 61 correspond to the plurality of through holes 432. The plurality of fin stacking pins 61 pass through the plurality of through holes 432, respectively, and the top end of each fin stacking pin 61 extends out of the side of the lifting support plate 430 away from the bottom plate 420 through the through holes 432.

The lifting support plate 430 is configured to place the fins. A through insertion hole is formed in the fin, and when the fin is placed on the lifting support plate 430, the top end of the fin stacking pin 61 is inserted into the corresponding insertion hole. Each fin stacking pin 61 can pass through a plurality of stacked fins, and a series of fins strung together by the fin stacking pin 61 form one fin stack.

The storing-fetching bracket 410 is provided with a driving device 440 configured to drive the lifting support plate 430 to move along the height direction of the storing-fetching bracket 410.

In some embodiments, the driving device 400 is a cylinder. In some other embodiments, the driving device 400 may be a motor.

When the lifting support plate 430 moves up and down along the height direction of the storing-fetching bracket 410, it can drive the fin stacks to move up and down, and the fin stacking pin 61 is fixed, while the insertion hole and the through hole 432 move up and down relative to the fin stacking pin 61.

After the fin stack 60 is formed in the storage space, a positioning pin 62 is also inserted into the fin stack 60. For example, the positioning pin 62 is inserted into the insertion hole of each fin in the fin stack through a positioning pin inserting robot (not shown in the figures) after the fin stack is formed.

The positioning pin 62 is arranged in a reserved insertion hole, one end of the positioning pin 62 is supported on the lifting support plate 430, and the other end of the positioning pin 62 pass through a reserved insertion hole of each fin of the fin stack 60 and extends to a position above the fin stack 60.

A position of the lifting support plate 430 corresponding to the positioning pin 62 is not provided with the through hole 432, and the positioning pin 62 moves along with the up-down movement of the lifting support plate 430, so that the fins in the same fin stack 60 are connected in series all the time.

Figure 6:
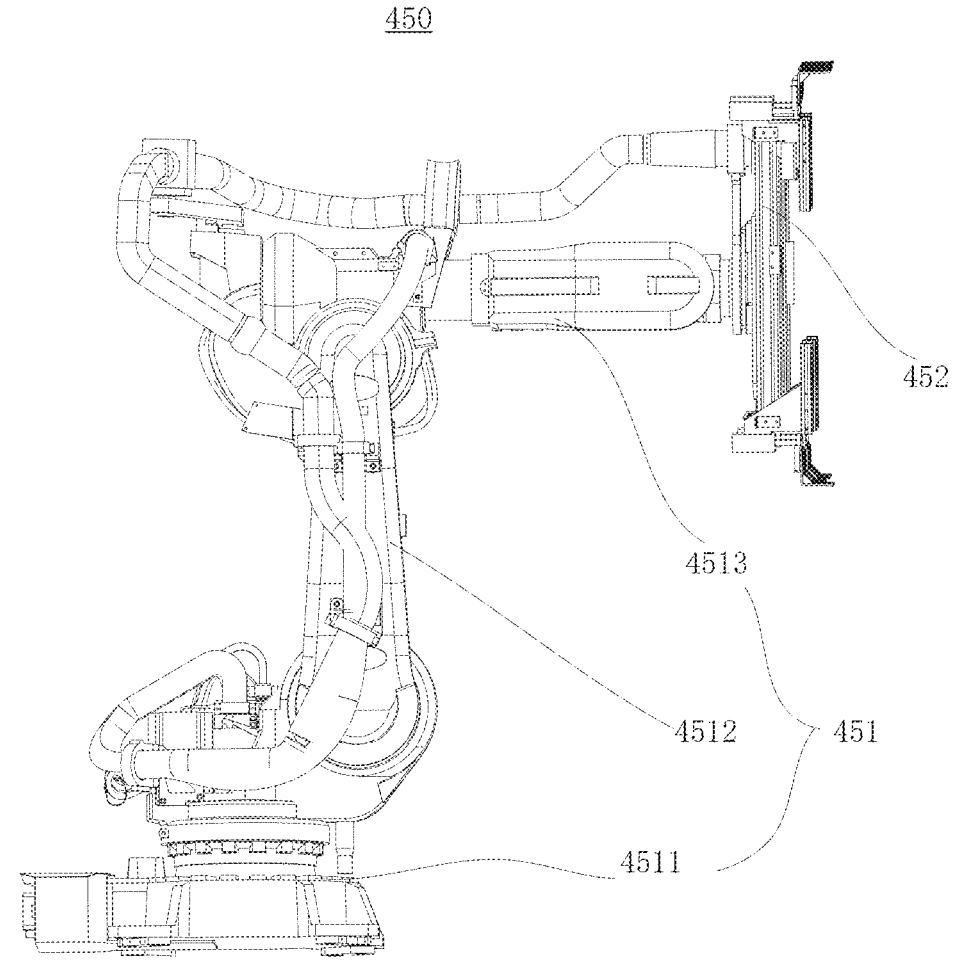
FIG. 6 is a structural view of a feeding robot in some embodiments.

The fin storing-fetching device further includes a feeding robot 450. Referring to FIG. 6, the feeding robot 450 is configured to transfer each fin stack 60 onto the upstream conveying line 41.

The feeding robot 450 includes a feeding robot body 451 and a feeding clamp 452, and the feeding clamp 452 is arranged on the feeding robot body 451.

The feeding robot body 451 includes a feeding robot base 4511, a feeding robot upper arm 4512, and a feeding robot lower arm 4513 which are connected in sequence.

In addition, the feeding robot 450 further includes a robot motor and a vision camera. The feeding robot base 4511 is fixed to the ground, for example, through bolts. The robot motor is connected to the feeding robot base 4511 of the feeding robot 450, for example, through bolts. The feeding robot base 4511, the feeding robot upper arm 4512, and the feeding robot lower arm 4513 are connected through slip joints. The vision camera is arranged on the feeding clamp 452 and configured to acquire position information of the fin stack 60.

Figure 7:
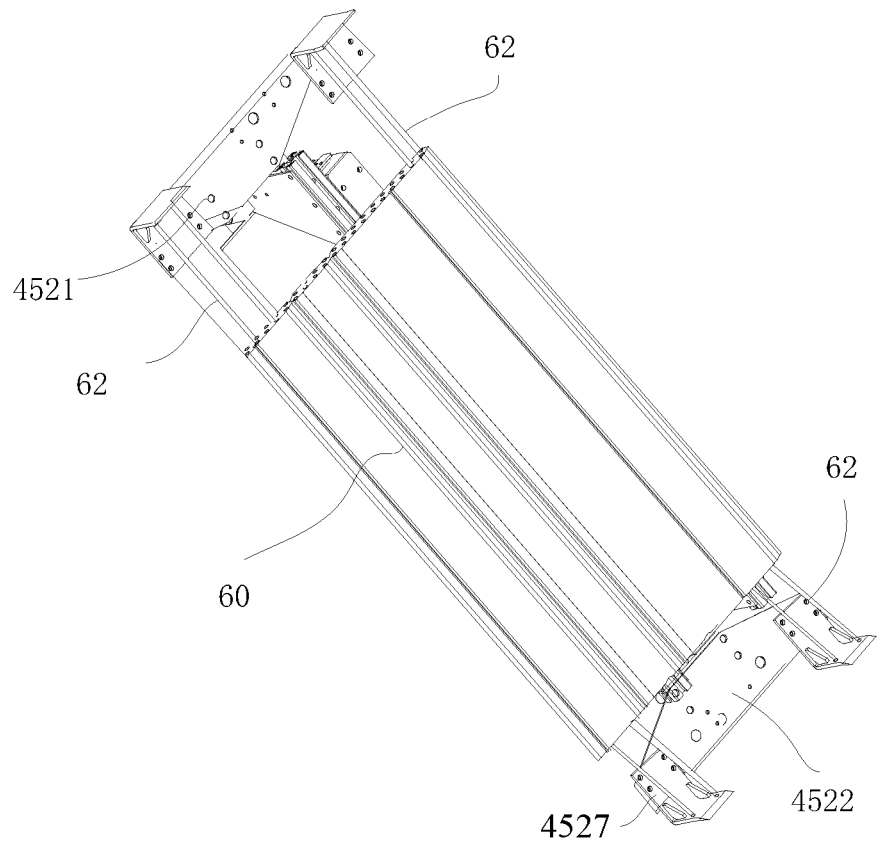
FIG. 7 is a structural view of a feeding clamp in some embodiments.
Figure 8:
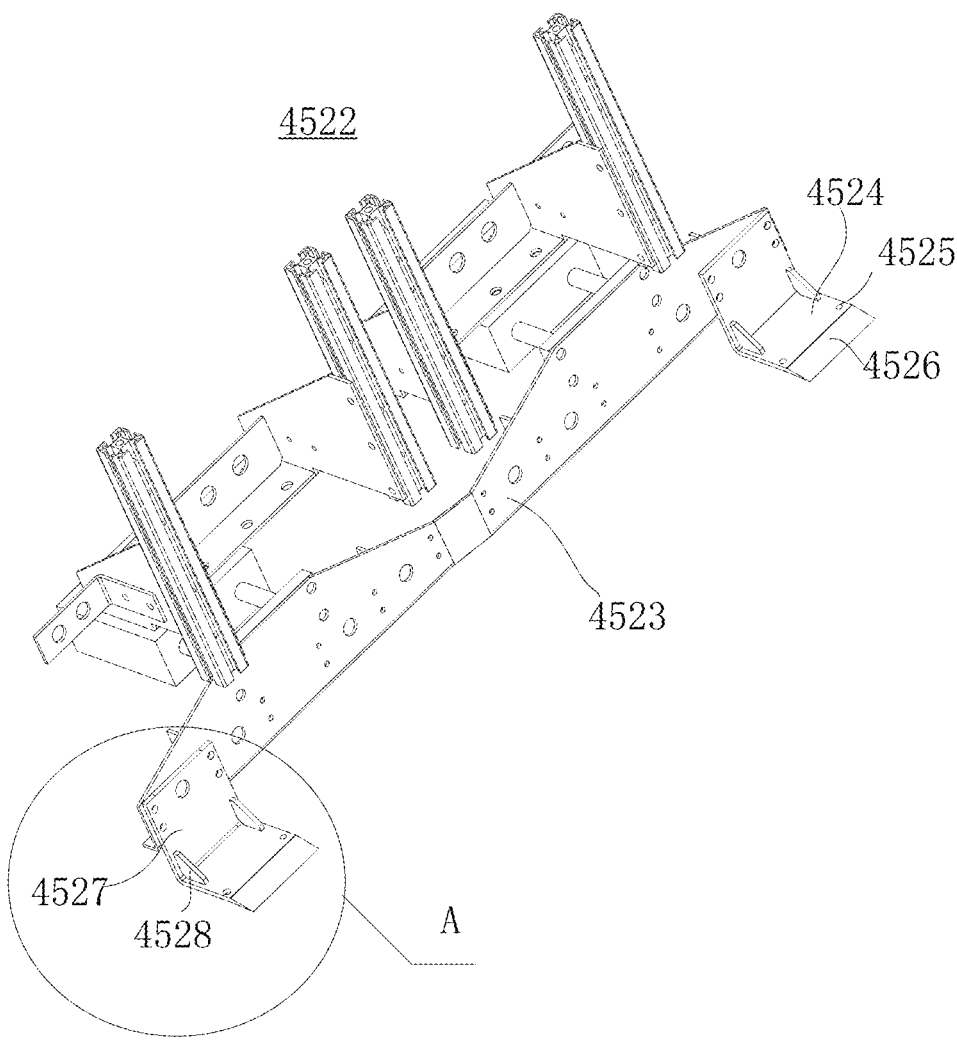
FIG. 8 is a structural view of a feeding clamping member in some embodiments.

Referring to FIG. 7 to FIG. 9, the feeding clamp 452 includes a first feeding clamping member 4521 and a second feeding clamping member 4522 which are symmetrically arranged. The first feeding clamping member 4521 and the second feeding clamping member 4522 are respectively provided with clamping portions for clamping both ends of the positioning pin 62.

The feeding robot 450 is configured to grip both ends of the fin stack 60 on the lifting support plate 430 and transfer the fin stack 60 to a target position, i.e., the upstream conveying line 41.

At least one positioning pin 62 is inserted into each of the two ends of the fin stack 60 along the length direction of each fin. The lower end of the positioning pin 62 is in contact with the lifting support plate 430, the upper end of the positioning pin 62 extends to an upper end of the fin stack 60, and the first feeding clamping member 4521 and the second feeding clamping member 4522 are respectively configured to clamp the upper end of the positioning pin 62 and the lower end of the positioning pin 62.

A first positioning recess with an opening facing the second feeding clamping member is formed on the first feeding clamping member, and a second positioning recess with an opening facing the first feeding clamping member is formed on the second feeding clamping member. When the first feeding clamping member and the second feeding clamping member clamp the fin stack under the action of a clamping power member, the two ends of the positioning pin inserted in the fin stack are respectively inserted into the first positioning recess and the second positioning recess.

For example, the first feeding clamping member 4521 and the second feeding clamping member 4522 are connected to a tail end of the feeding robot lower arm 4513 through clamping power members. The first feeding clamping member 4521 includes two spaced first feeding clamping jaws, the second feeding clamping member 4522 includes two spaced second feeding clamping jaws, the first feeding clamping jaws are configured to clamp the upper end of the positioning pin 62, and the second feeding clamping jaws are configured to clamp the lower end of the positioning pin 62. It can be understood that the number of the feeding clamping jaws are not limited in the present application.

Two clamping power members may be provided, and each clamping power member includes an output end. The output end of one clamping power member is connected to the first feeding clamping jaw, and the output end of another clamping power member is connected to the second feeding clamping jaw.

Alternatively, one clamping power member is provided, and the clamping power member is provided with two output ends. The two output ends are respectively located on two sides of the clamping power member and respectively connected to the first feeding clamping jaw and the second feeding clamping jaw.

The first feeding clamping jaw and the second feeding clamping jaw are connected to the clamping power member through adapter plates 4523 respectively. That is, the output end of the clamping power member is connected to the adapter plate 4523, and the first feeding clamping jaw and the second feeding clamping jaw are fixedly connected to the adapter plates 4523 on the corresponding sides respectively.

A first positioning clamping plate perpendicular to the adapter plate 4523 is formed on the first feeding clamping jaw, and at least one first positioning recess with an opening facing the second feeding clamping jaw is formed on the first positioning clamping plate.

A second positioning clamping plate 4524 perpendicular to the adapter plate 4523 is formed on the second feeding clamping jaw, and at least one second positioning recess 4525 with an opening facing the first feeding clamping jaw is formed on the second positioning clamping plate 4524.

In a clamped state, the upper end of the positioning pin 62 is inserted into the first positioning recess, and the lower end of the positioning pin 62 is inserted into the second positioning recess 4525.

The first feeding clamping jaw further includes a first connecting plate. The first connecting plate is arranged perpendicular to the first positioning clamping plate, and the first positioning clamping plate is detachably connected to the adapter plate 4523 through the first connecting plate.

The second feeding clamping jaw further includes a second connecting plate 4527. The second connecting plate 4527 is arranged perpendicular to the second positioning clamping plate 4524, and the second positioning clamping plate 4524 is detachably connected to the adapter plate 4523 through the second connecting plate 4527.

The first positioning clamping plate and the second positioning clamping plate are detachably connected to the adapter plate, so that when the positioning clamping plates become worn and affect their use, they can be conveniently replaced without the need to replace the entire robot, thereby saving maintenance costs.

The first connecting plate and the first positioning clamping plate are integrated, and the second connecting plate 4527 and the second positioning clamping plate 4524 are integrated. Reinforcing ribs 4528 are arranged between the first connecting plate and the first positioning clamping plate and between the second connecting plate 4527 and the second positioning clamping plate 4524, so as to improve strength of the connection between the first connecting plate and the first positioning clamping plate and the connection between the second connecting plate 4527 and the second positioning clamping plate 4524.

An end portion of the second positioning clamping plate 4524 corresponding to the lower end of the fin stack 60 is provided with a guiding inclined surface 4526. The guiding inclined surface 4526 is configured to lift the bottommost fin of the fin stack 60 and guide the lower end of the positioning pin 62 into the second positioning recess 4525 during movement of the second feeding clamping jaw to the bottom of the fin stack 60.

In order to facilitate gripping of the second positioning clamping plate 4524, in some embodiments of the present application, the lifting support plate 430 is provided with a support protrusion 431 extending upwards, and a length of the support protrusion 431 along the first direction is smaller than a length of the fin.

Each fin stack 60 is supported on the support protrusion 431, a gripping gap is formed between the bottom of each fin stack 60 and the lifting support plate 430 under the action of the support protrusion 431, and the second feeding clamping member 4522 moves from the gripping gap to the bottom of the fin stack 60 to clamp the positioning pin 62.

In order to avoid interference between the adapter plate 4523 on the second positioning clamping plate 4524 and the support protrusion 431 during clamping, in some embodiments of the present application, a length of the second connecting plate 4527 is designed to extend away from the first connecting plate and beyond the edge of the adapter plate 4523, so that the adapter plate 4523 is located above the support protrusion 431 during clamping of the second positioning clamping plate 4524 to avoid the interference.

The end plate mounting device 500 is introduced below.

Figure 10:
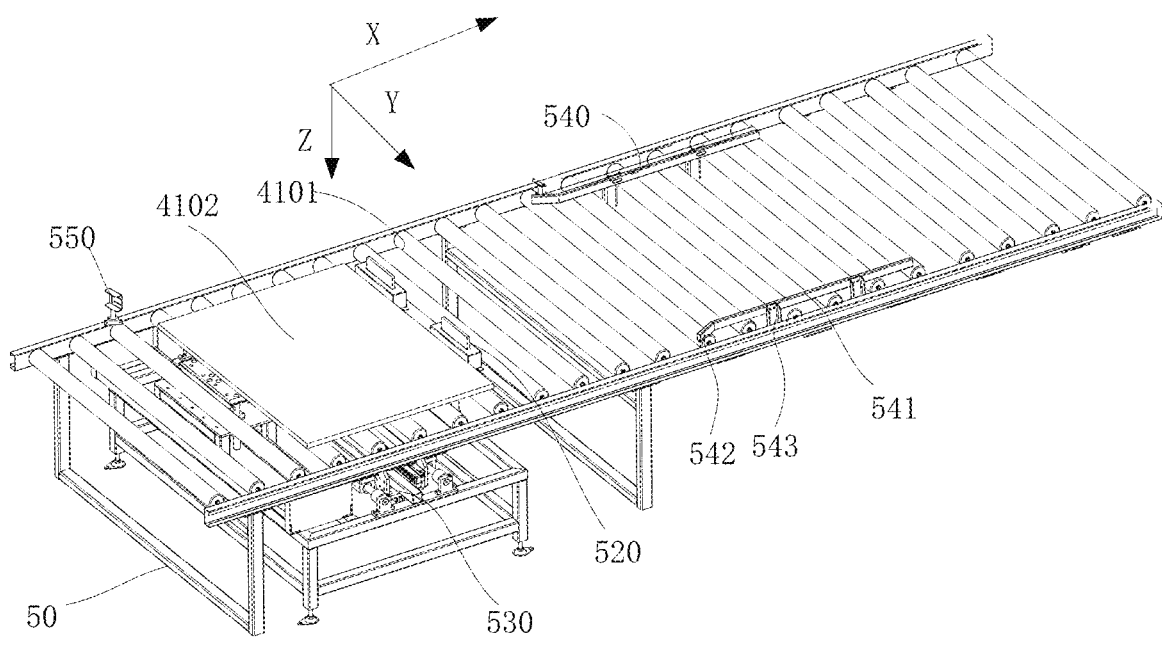
FIG. 10 is a partial structural view of an end plate mounting device according to some embodiments.
Figure 11:
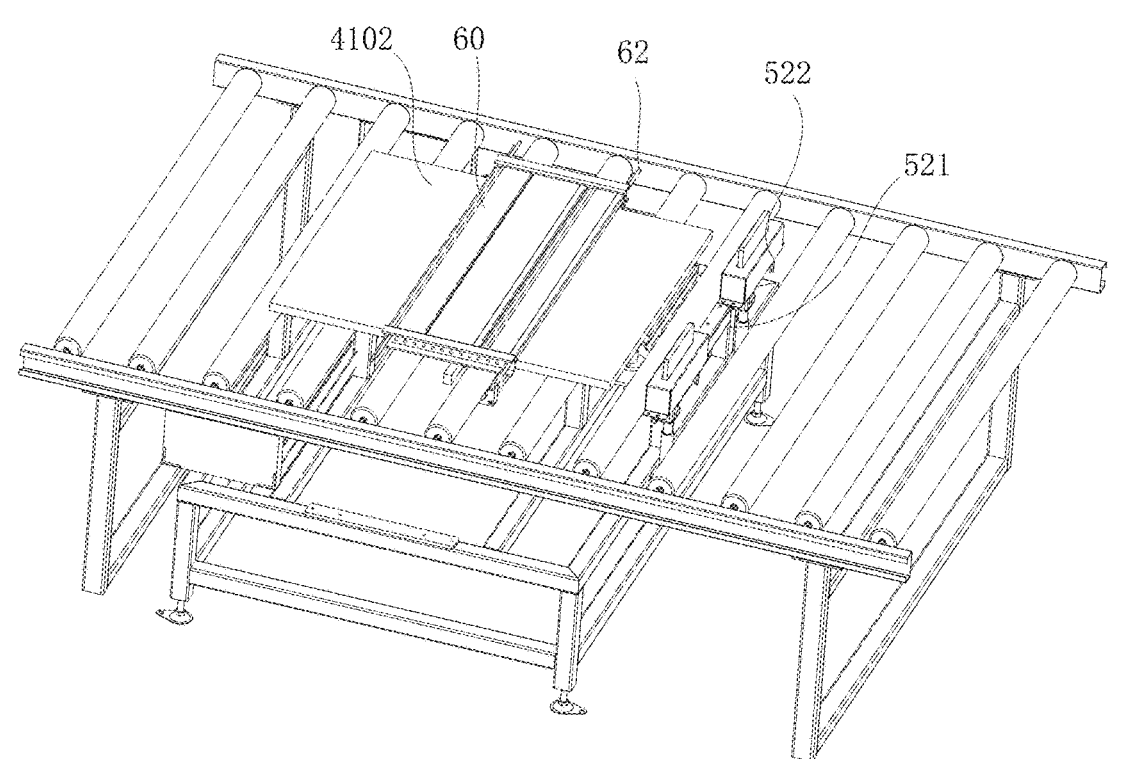
FIG. 11 is a schematic view showing a state of conveyance of a fin stack on the end plate mounting device according to some embodiments.
Figure 12:
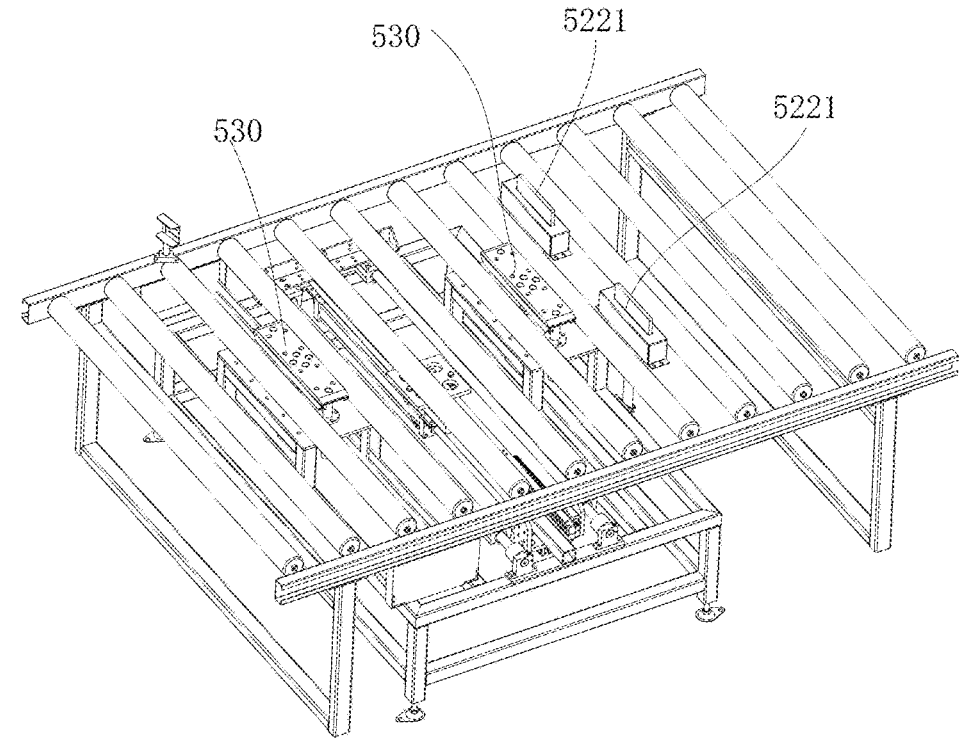
FIG. 12 is a schematic diagram showing a position of a jacking member on the end plate mounting device according to some embodiments.
Figure 13:
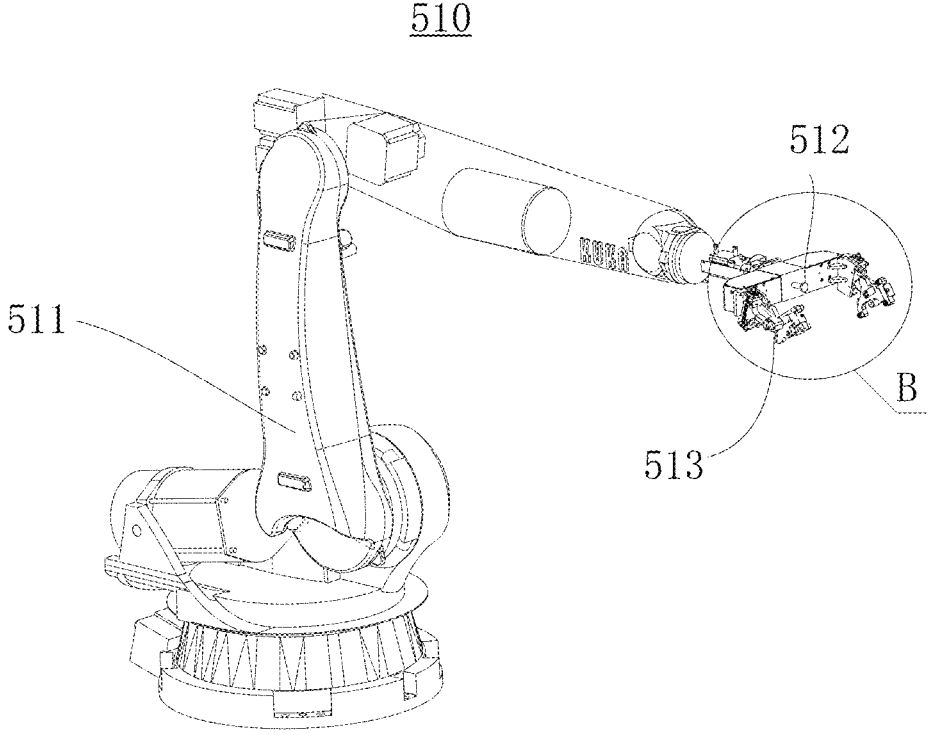
FIG. 13 is a structural view of an end plate mounting robot according to some embodiments.
Figure 14:
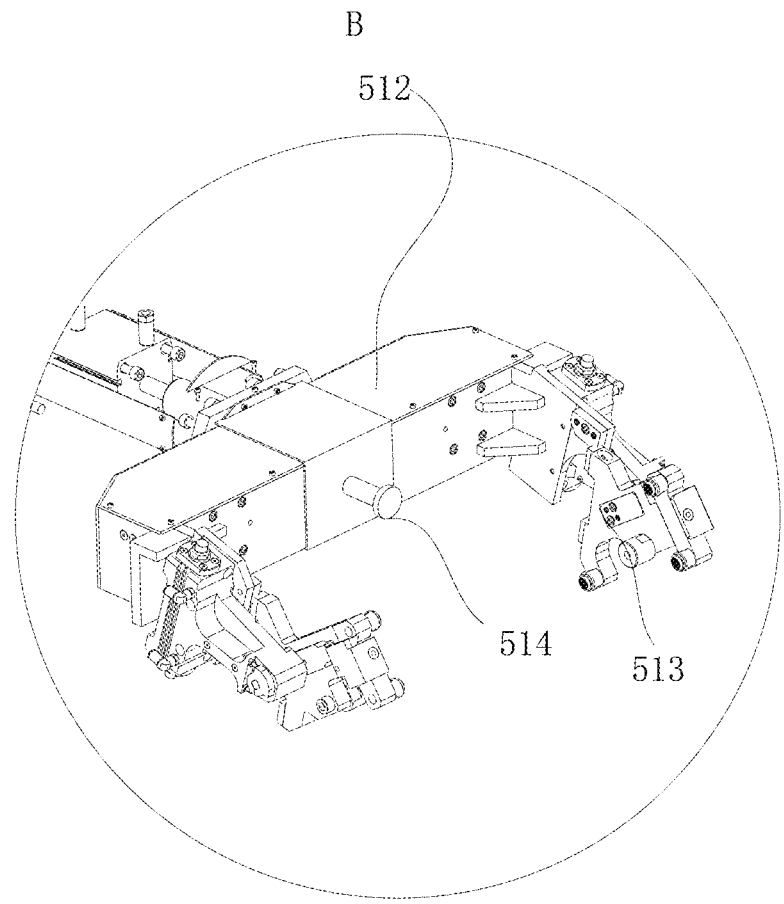
FIG. 14 is a schematic diagram of a connection at B in FIG. 13.
Figure 15:
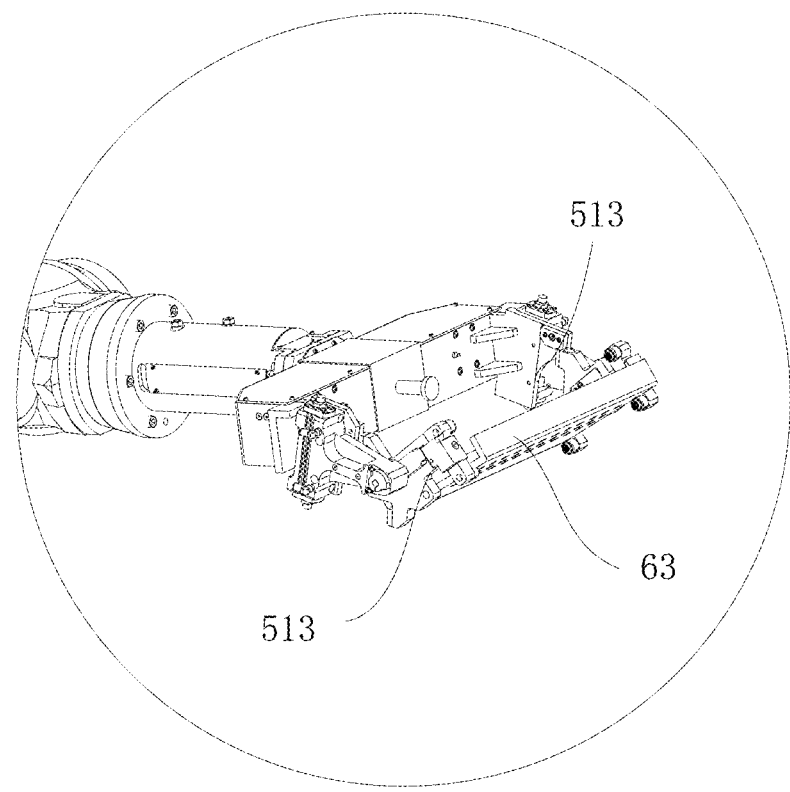
FIG. 15 is a view of a state that an end plate clamp clamps an end plate member according to some embodiments.
Figure 16:
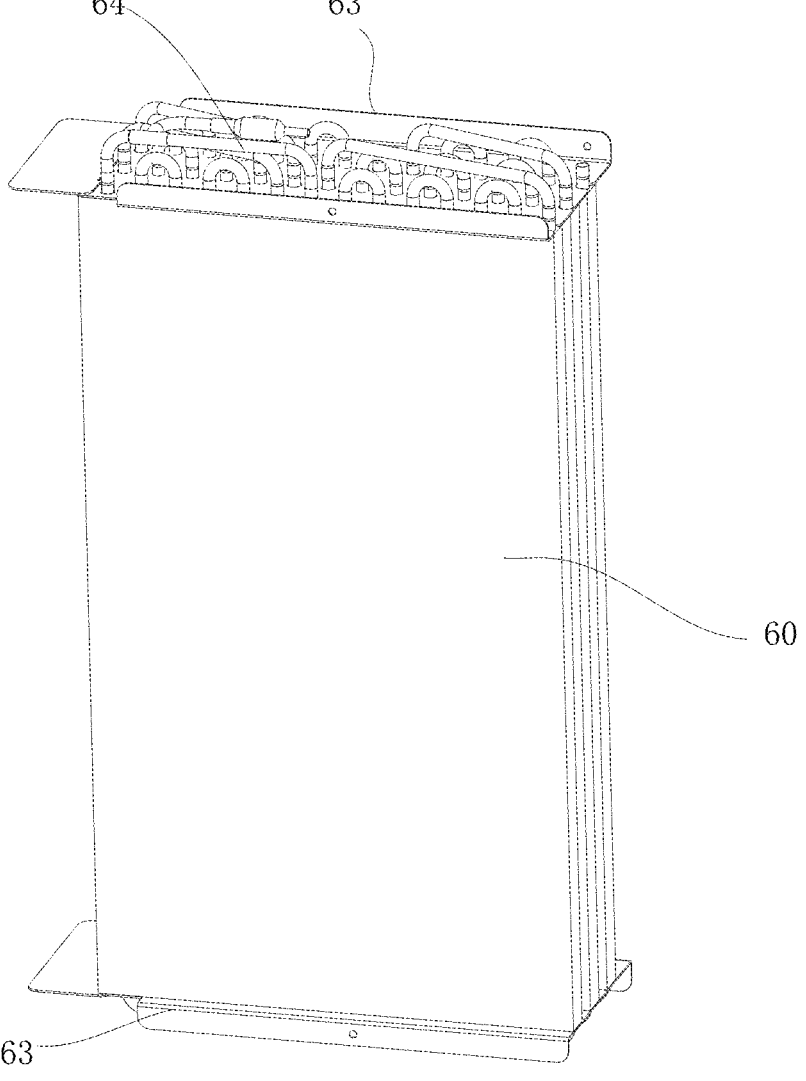
FIG. 16 is a structural view of a heat exchanger according to some embodiments.

Referring to FIG. 10 to FIG. 11, the end plate mounting station is arranged on the fin conveying line 40, and the end plate mounting device 500 is adapted to the end plate mounting station.

The end plate mounting device 500 includes end plate mounting robots 510. The end plate mounting robots 510 are symmetrically arranged at both sides of the fin conveying line 40 and configured to simultaneously mount end plate members 63 to both ends of the fin stack 60.

Each end plate mounting robot 510 includes an end plate mounting robot body 511, a connecting beam 512, a clamping power member and two end plate clamps 513. The connecting beam 512 is mounted on the end plate mounting robot body, and the clamping power member is mounted on the connecting beam 512. The two end plate clamps 513 are arranged on the clamping power member, and under the action of the clamping power member, the two end plate clamps 513 move towards each other or oppositely to clamp or release the end plate member 63.

The clamping power member is arranged along a length direction of the connecting beam 512. The clamping power member is provided with a first telescopic end and a second telescopic end, and the two end plate clamps 513 are mounted on the first telescopic end and the second telescopic end respectively.

Alternatively, in some other embodiments, the clamping power members correspond to the end plate clamps 513, the two clamping power members are symmetrically arranged on the connecting beam 512, and the end plate clamps 513 are mounted at the output ends of the clamping power members.

The end plate mounting device 500 further includes a lifting stopper 520. The lifting stopper 520 is provided on the fin conveying line 40. The lifting stopper 520 rises to stop the fin stack 60 before the fin stack 60 is conveyed to the end plate mounting station.

In some embodiments, the lifting stopper 520 includes a lifting driving member 521 and a stopping portion 522. The lifting driving member 521 is arranged below the fin conveying line 40, and the stopping portion 522 is mounted at an output end of the lifting driving member 521. Under the action of the lifting driving member 521, the stopping portion 522 is lifted and lowered between the corresponding adjacent rollers 4101 on the fin conveying line 40, so as to stop and correct the position of the fin stack 60 at a corresponding position on the fin conveying line 40.

The stopping portion 522 includes at least two stopping blocks 5221 arranged at intervals in an axial direction of the roller 4101, and the at least two stopping blocks 5221 are connected to the output end of the lifting driving member 521. The lifting driving member 521 drives the at least two stopping blocks 5221 to rise simultaneously, and before the fin stack 60 is conveyed to the end plate mounting station, the at least two stopping blocks 5221 rise to positions above the roller 4101 to stop forward conveyance of the fin stack 60.

When the fin stack 60 is angularly skewed relative to the roller 4101, the stopping blocks 5221 can adjust the fin stack 60 to be parallel to the axial direction of the roller 4101, thus facilitating the end plate mounting robot to mount the end plate member 63.

An end plate clamping position is formed between the two end plate clamps 513 of the end plate mounting robot 510. A pushing member 514 extending towards the end plate clamping position is arranged on the connecting beam 512. The pushing member 514 includes a pushing power member and a pushing end portion. The pushing power member is fixed on the connecting beam 512, and the pushing end portion is fixed at an output end of the pushing power member. The pushing member 514 is configured to push the end plate member 63 clamped by the end plate clamps 513 to install the end plate member 63 onto the fin stack.

The fin conveying line 40 is further provided with a supporting plate 4102. The fin stack 60 is placed on the supporting plate 4102 by the feeding robot 450, such that the positioning pin within the fin stack is parallel to the width direction of the fin conveying line and parallel to the supporting plate. The fin conveying line transports the fin stack along the running direction of the conveying line via the supporting plate 4102.

The end plate mounting device 500 further includes a jacking member 530. The jacking member 530 is arranged upstream of the lifting stopper 520 and includes a jacking block driving member and a jacking block. The jacking block driving member is arranged below the end plate mounting station. The jacking block is mounted at an output end of the jacking block driving member. Under the action of the jacking block driving member, the jacking block is lifted and lowered between the corresponding rollers 4101 to upwards jack the supporting plate conveyed to the position of the jacking block.

In some embodiments, the jacking block driving member is a cylinder.

The conveying direction of the fin conveying line 40 is defined as an X direction, a width direction of the fin conveying line 40 is defined as a Y direction, a height direction of the fin conveying line 40 is defined as a Z direction, a dimension of the end plate member 63 along the Z direction is defined as a width of the end plate member 63, a dimension of the fin stack 60 along the Z direction is defined as a width of the fin stack 60, the width L1 of the end plate member 63 is greater than the width L2 of the fin stack 60, and a thickness L3 of the supporting plate member 4102 meets the following requirement: $L3>(L1-L2)/2$, so as to avoid interference with the roller 4101 when the end plate members 63 are mounted on both ends of the fin stack 60.

A detection member 550 is further arranged upstream of the end plate mounting station. The detection member 550 is mounted on the support frame 50 and located at one side of the roller 4101. The detection member 550 is configured to detect the position of the supporting plate 4102 carrying the fin stack, and generate a detection signal when it detects that the supporting plate carrying the fin stack has reached a predetermined position. The detection member 550 is connected to a controller 70, and the controller 70 is in communication with the lifting driving member 521 and the jacking block driving member. The controller 70 is configured to receive the detection signal from the detection member 550 and control movement of the lifting driving member 521 and the jacking block driving member according to the detection signal.

The controller 70 is a control center of the whole processing line, and is configured to control starting and stopping of the fin conveying line 40, work of each robot, and starting and stopping of each device. A control process of the controller can be referenced in relevant technologies and is not described in detail.

In some other embodiments, a centering assembly 540 is further arranged on the fin conveying line 40. The centering assembly 540 includes two centering beams 541 symmetrically arranged on the fin conveying line 40. The centering beams 541 are located downstream of the end plate mounting station, and a centering channel is formed between the centering beams 541 for centering the supporting plate to the middle position of the fin conveying line 40.

An end of each centering beam 541 near the end plate mounting station is provided with a guide section 542, and a guide channel that tapers in the conveying direction of the fin stack 60 is formed between the two guide sections 542.

The centering beam 541 is fixed on the support frame 50 through a centering bracket 543, and a height of the centering beam 541 is smaller than that of the positioning pin 62 on the fin stack.

After an end plate is mounted, the stopping block 5221 on the lifting stopper 520 is lowered, and the fin stack 60 continues to be conveyed downstream along the fin conveying line 40.

After the end plate members 63 at the two ends of the fin stack 60 pass through the guide channel, the fin stack 60 is moved to the middle position of the fin conveying line 40 under the action of the guide section 542, so that position accuracy of the fin stack 60 during conveying is improved, and the pipe inserting robot 610 is convenient to operate during subsequent pipe inserting.

A plurality of limiting protrusions are arranged on the opposing sides of the two end plate clamps 513. A clamping position for limiting the end plate member 63 is formed between the limiting protrusions of each end plate clamp 513. During clamping, an end portion of the end plate member 63 is located between the limiting protrusions, and a position of the end plate member 63 is limited to prevent the end plate member 63 from being separated from the end plate clamps 513.

Referring to FIG. 13 to FIG. 16, similar to the feeding robot body 451, the end plate mounting robot body 511 includes an end plate mounting robot base, an end plate mounting robot upper arm, and an end plate mounting robot lower arm which are connected in sequence.

In addition, the end plate mounting robot also includes a robot motor and a vision camera. The end plate mounting robot base is fixed to the ground through bolts, and the robot motor is connected to the end plate mounting robot base through bolts. The end plate mounting robot base, the end plate mounting robot upper arm, and the end plate mounting robot lower arm are connected through slip joints. The vision camera is arranged on the end plate clamp 513 and configured to acquire position information of the fin stack 60 and the positioning pin 62. The end plate mounting robot mounts the end plate member according to the position information.

The end plate member 63 is also provided with through holes corresponding to the fins. When mounting the end plate member 63 to the fin stack 60, the positioning pin 62 on the fin stack 60 is inserted into the corresponding through hole of the end plate member 63. After insertion of the end plate member 63 is completed, the pushing power member drives the pushing end portion to push the end plate member 63 forwards, and the end plate members 63 on the two sides are simultaneously pushed to the middle, so that the end plate members 63 are mounted in place, gaps between the fins are filled, and the fins are tightly connected.

After the end plate members 63 are mounted, the fin stack 60 is conveyed downstream along the fin conveying line 40 to the pipe inserting station.

The pipe inserting device 600 is arranged beside the pipe inserting station. The pipe inserting device 600 grips a pipe member 64 and insert the pipe member 64 into the insertion hole in the fin stack 60.

Figure 17:
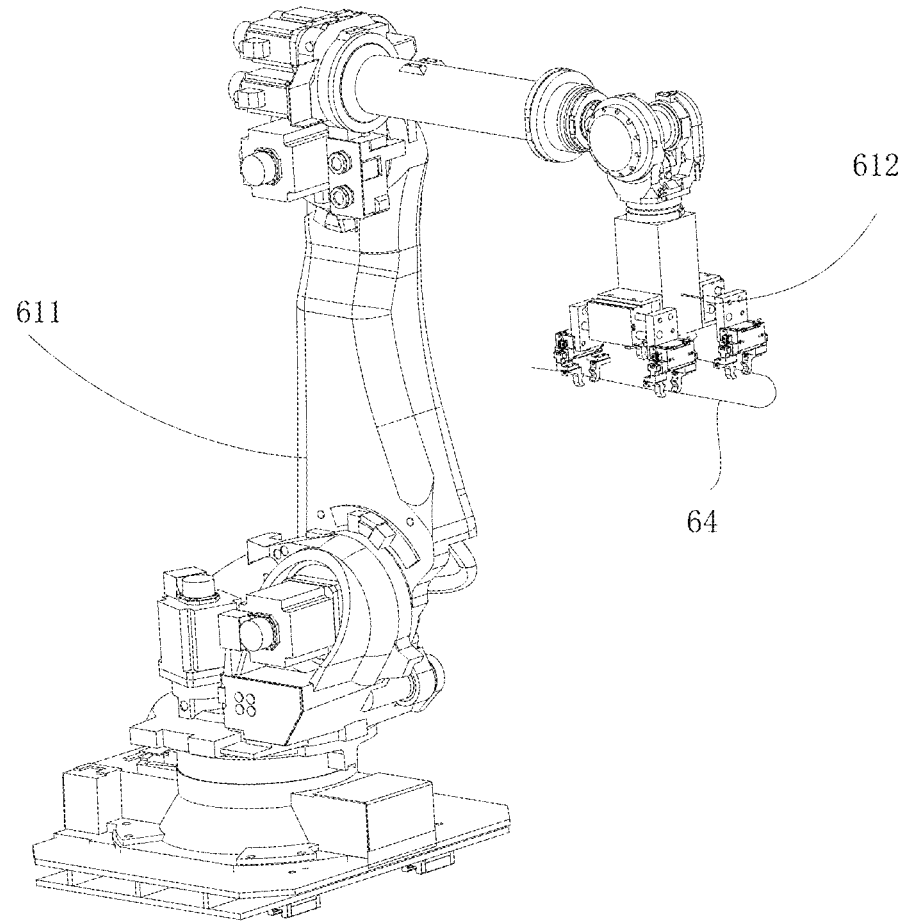
FIG. 17 is a structural view of a pipe inserting robot according to some embodiments.
Figure 18:
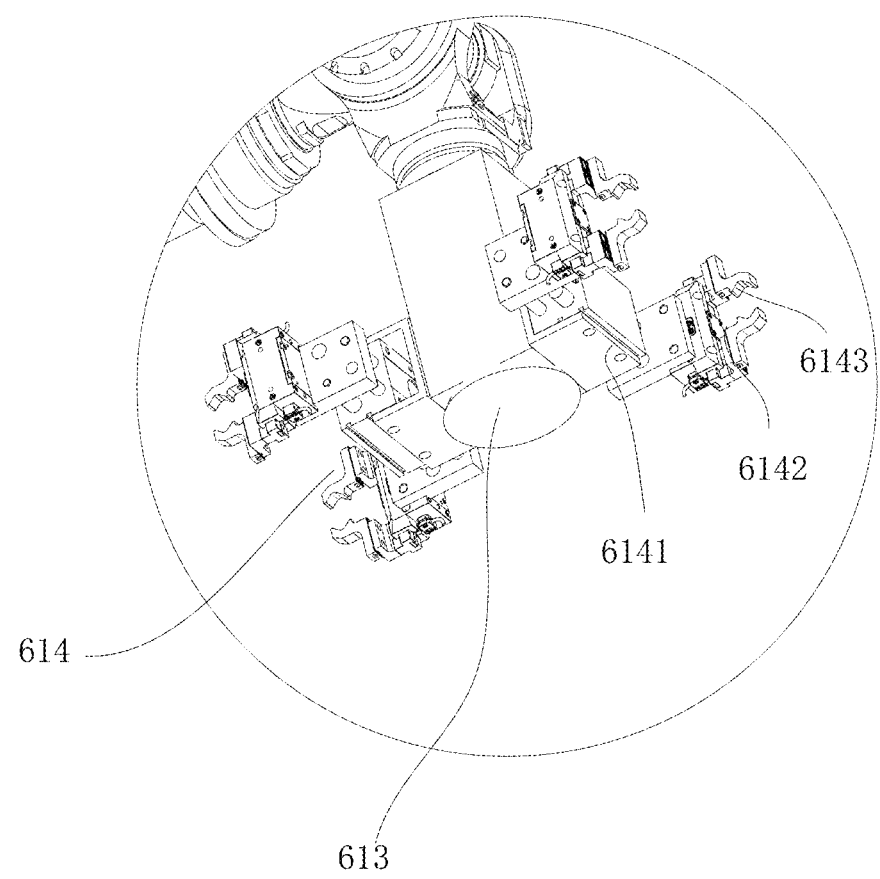
FIG. 18 is a structural view of a pipe inserting clamp according to some embodiments.

Referring to FIG. 17 and FIG. 18, the pipe inserting device 600 includes a pipe inserting robot 610. The pipe inserting robot 610 includes a pipe inserting robot body 611 and a pipe inserting clamp 612. The pipe inserting clamp 612 is connected to the pipe inserting robot body 611 and includes two spaced pipe inserting assemblies. Each pipe inserting assembly includes a middle connecting portion 613 and at least one pipe gripper 614 arranged on the middle connecting portion 613. The pipe inserting device 600 grips the pipe member 64 through the pipe gripper 614 and inserts the pipe member 64 into the fin stack 60 under driving of the pipe inserting robot body 611.

In addition, the pipe inserting robot 610 also includes a robot motor and a vision camera. A pipe inserting robot base is fixed to the ground, for example, through bolts, and the robot motor is connected to the pipe inserting robot base, for example, through bolts. The pipe inserting robot base, a pipe inserting robot upper arm, and a pipe inserting robot lower arm are connected through slip joints. The vision camera is arranged on the pipe inserting clamp 612 and configured to acquire position information of the fin stack 60 and the insertion hole.

Each pipe gripper 614 includes a gripper driving member 6141 and two gripper tips 6142. A first telescopic end and a second telescopic end are formed on two ends of the gripper driving member 6141, respectively. The two gripper tips 6142 are respectively arranged on the first telescopic end and the second telescopic end. A gripper recess 6144 is formed on each gripper tip 6142, and the pipe member 64 is configured to be clamped in a gripper position formed by the two gripper recesses 6144. In some embodiments, the gripper driving member 6141 is a cylinder.

The whole pipe member 64 is of a U-shaped structure, and both ends of the pipe member 64 are simultaneously inserted into the corresponding insertion holes of the fin stack 60. In order to improve stability of clamping of the pipe member 64, each pipe inserting clamp 612 includes two spaced pipe grippers 614, and the pipe grippers 614 on each pipe inserting clamp 612 are configured to clamp a pipe on one side of the pipe member 64 for insertion.

At least two pipe inserting devices 600 are arranged at intervals along the conveying direction of the fin conveying line 40, so as to improve an inserting efficiency of the pipe members 64.

In addition to the insertion of the pipe member 64, the pipe inserting robot 610 may detach the positioning pin 62, which is, for example, but not limited to, the following case: after the pipe inserting robot 610 located upstream performs the insertion of some pipe members 64, the fin stack 60 is conveyed to a position corresponding to the pipe inserting robot 610 located downstream, and after the pipe inserting robot 610 located downstream detaches the positioning pin 62, the remaining pipe members are inserted.

When the positioning pin 62 is detached, the pipe inserting robot lower arm of the pipe inserting robot 610 may be rotated by 90 degrees to push out the positioning pin 62. In this way, only one of the pipe grippers 614 is required to remove a single positioning pin 62.

The motion of the pipe inserting robot lower arm may be referenced from relevant technologies and is not a design focus of the application, therefore, it is not described herein.

After pipe inserting is completed, the fin stack 60 is continuously conveyed downstream to a pipe expansion station, and a pipe expansion operation is performed on the pipe member 64 through the pipe expanding device 43.

After pipe expansion is finished, the fin stack 60 is transferred to the drying device 44 from the fin conveying line 40 by the transfer robot 45 for a drying operation, and after drying is finished, the fin stack 60 is continuously transferred to the downstream conveying line 42 by the transfer robot 45.

Figure 19:
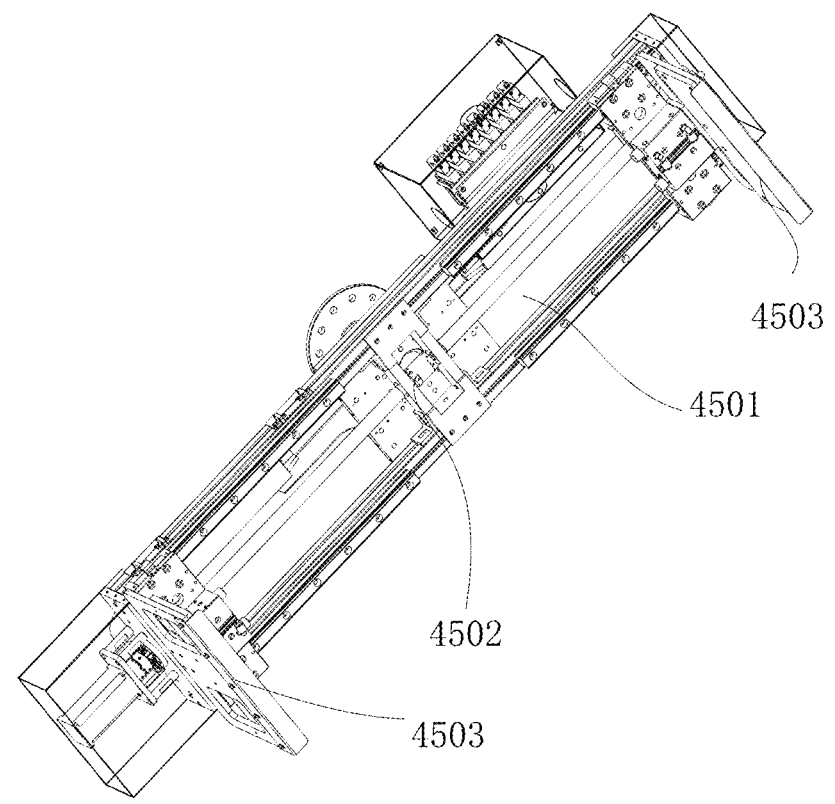
FIG. 19 is a structural view of a transfer clamp according to some embodiments.

Referring to FIG. 19, the transfer robot 45 includes a transfer robot body and a transfer clamp. The transfer clamp is arranged on the transfer robot body. The transfer clamp includes a transfer beam 4501, a transfer driving member 4502 and a transfer clamping plate 4503. The transfer beam 4501 is connected to the transfer robot body. The transfer driving member 4502 is mounted on the transfer beam 4501. A first telescopic end and a second telescopic end are formed on the transfer driving member 4502, two transfer clamping plates 4503 are provided and arranged at the first telescopic end and the second telescopic end respectively, and the transfer clamping plates 4503 moves toward or away from each other under the driving force of the transfer driving member to clamp or release the end plate members 63 at the two ends of the fin stack 60.

On the downstream conveying line 42, a bent pipe is connected to the fin stack 60 through a bent pipe mounting device 46. The bent pipe mounting device 46 is a bent pipe mounting robot which has a structure similar to that of the pipe inserting robot 610, and the bent pipe mounting robot grips a U-shaped pipe and inserts the U-shaped pipe onto the pipe member 64 on the fin stack 60 through mechanical vision positioning.

It should be noted that, when the heat exchanger is an outdoor heat exchanger, a last step is to bend the heat exchanger into an L-shape, so that in the process of inserting the bent pipe, a certain height difference exists between end portions of two fins of the bent outdoor heat exchanger, and therefore, the bent pipe needs to be inclined by a certain angle when inserted. For the evaporator, bending is not required, so that two aluminum sheets forming the evaporator do not have a height difference, and the bent pipe does not need to be inclined when inserted.

When the bent pipe of the outdoor heat exchanger is inserted, the pipe inserting clamp of the bent pipe mounting robot automatically deflects by a preset angle through the bent pipe mounting robot lower arm, so as to insert the bent pipe to the pipe member 64.

After the bent pipe is mounted at the end portion of the fin stack 60, the fin stack is conveyed to the nitrogen charging station for a nitrogen charging operation.

Figure 20:
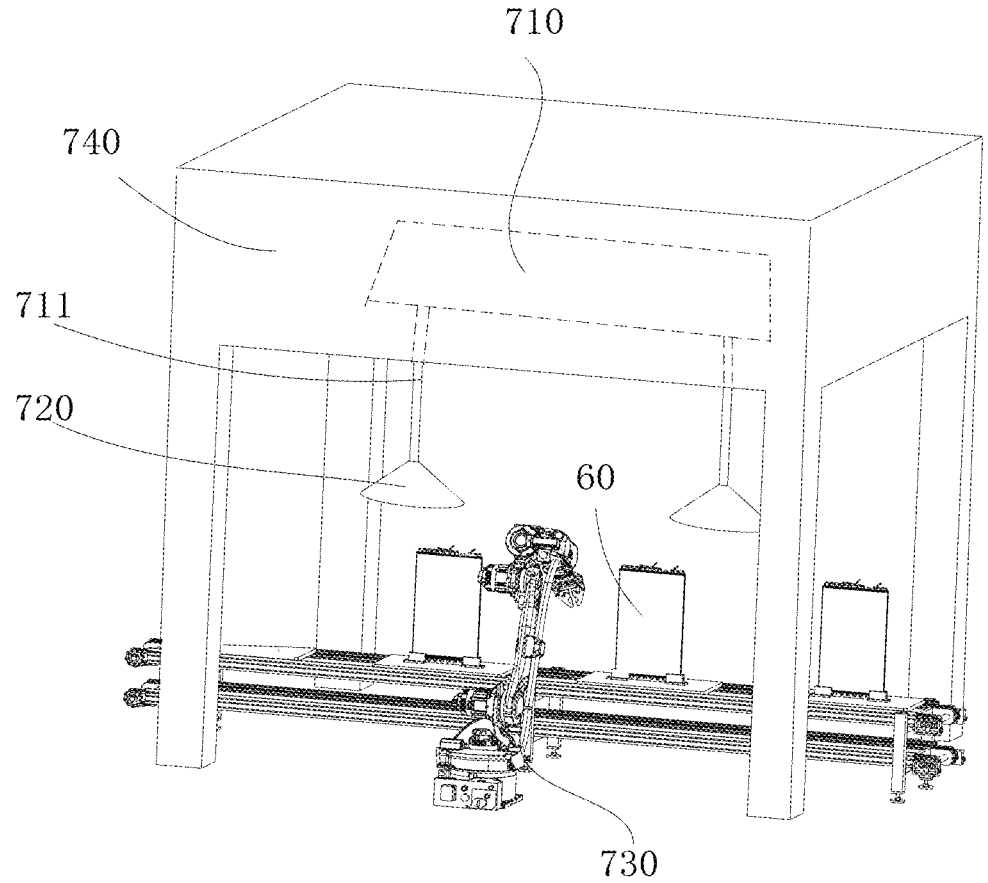
FIG. 20 is a structural view of a nitrogen charging device according to some embodiments.

Referring to FIG. 20, the nitrogen charging device 700 includes a nitrogen charging apparatus 710, a nitrogen charging docking member 720 and a nitrogen charging robot 730. The nitrogen charging apparatus 710 is externally connected with a nitrogen charging pipe 711, and the nitrogen charging docking member 720 is arranged at an end portion of the nitrogen charging pipe 711. In some embodiments, a docking channel which is gradually expanded away from the nitrogen charging pipe 711 is formed in the nitrogen charging docking member 720. The docking channel is configured to guide the connection process between the nitrogen charging pipe 711 and the pipe member 64.

Figure 21:
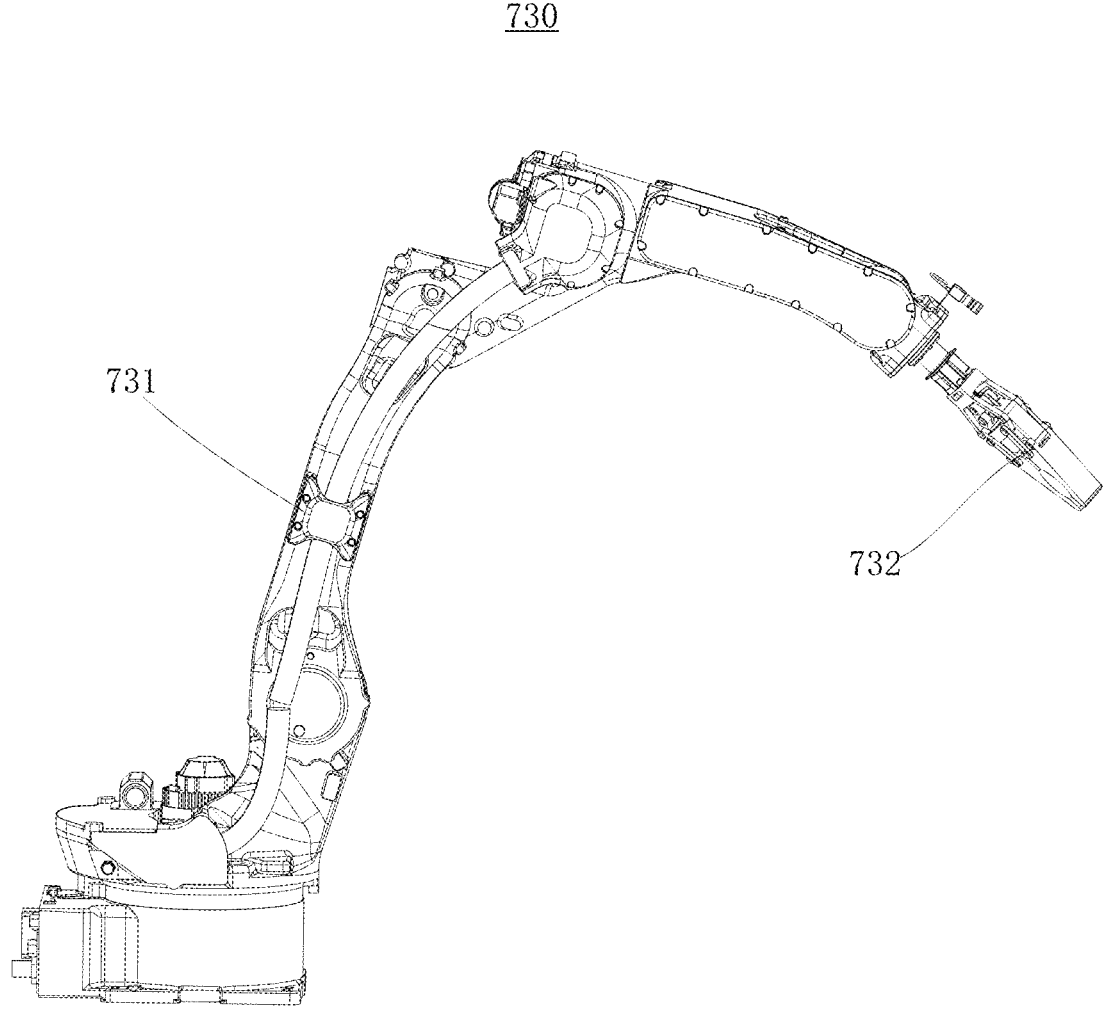
FIG. 21 is a structural view of a nitrogen charging robot according to some embodiments.

Referring to FIG. 21, the nitrogen charging robot 730 includes a nitrogen charging robot body 731 and a nitrogen charging clamp 732. The nitrogen charging robot 730 is arranged beside the nitrogen charging station on the fin conveying line 40. The nitrogen charging clamp 732 is arranged on the nitrogen charging robot 730, and the nitrogen charging clamp 732 is configured to clamp the nitrogen charging docking member 720 to dock the nitrogen charging docking member 720 with the pipe member 64 on the fin stack 60 for charging nitrogen into the pipe member 64.

In some embodiments, the nitrogen charging apparatus 710 is arranged in a nitrogen charging room 740. The nitrogen charging room 740 is provided with a mounting opening, and the nitrogen charging pipe 711 extends from the mounting opening to the outside of the nitrogen charging room 740.

The nitrogen charging room 740 is supported right above the nitrogen charging station through supporting legs. The mounting opening is formed in a bottom wall of the nitrogen charging room 740, the nitrogen charging pipe 711 extends out of a position right below the nitrogen charging room 740, and the nitrogen charging docking member 720 is connected to the nitrogen charging pipe 711.

Figure 23:
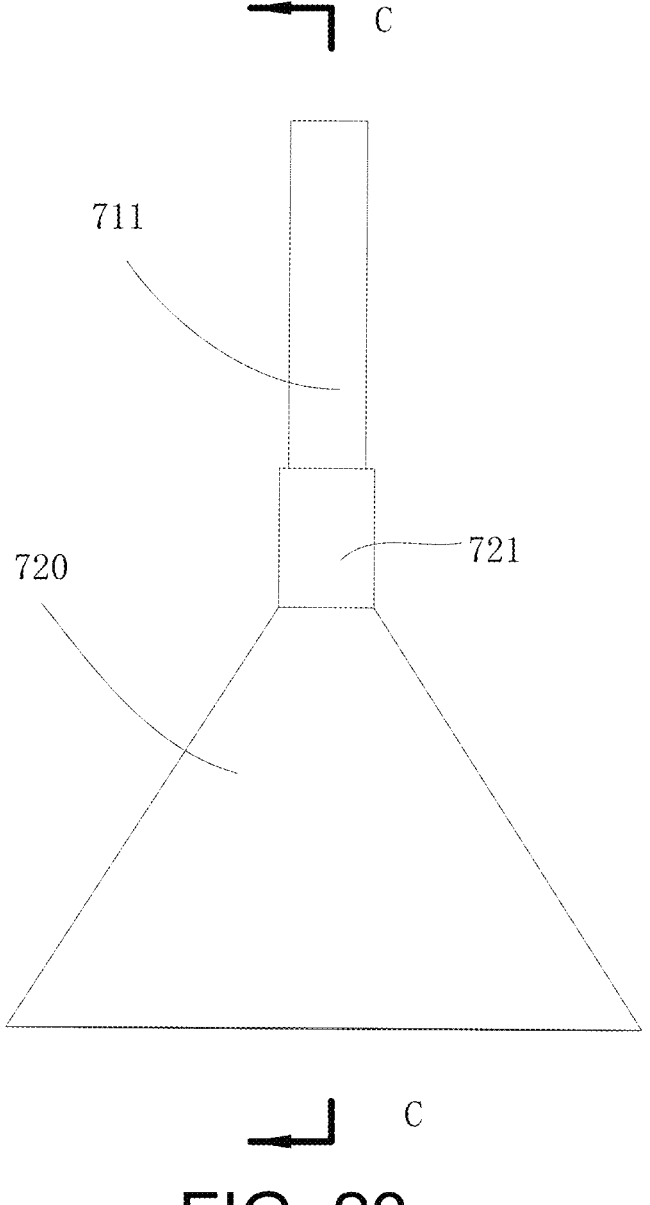
FIG. 23 is a schematic diagram showing a connection between a nitrogen charging docking member and a pipe member according to some embodiments.
Figure 24:
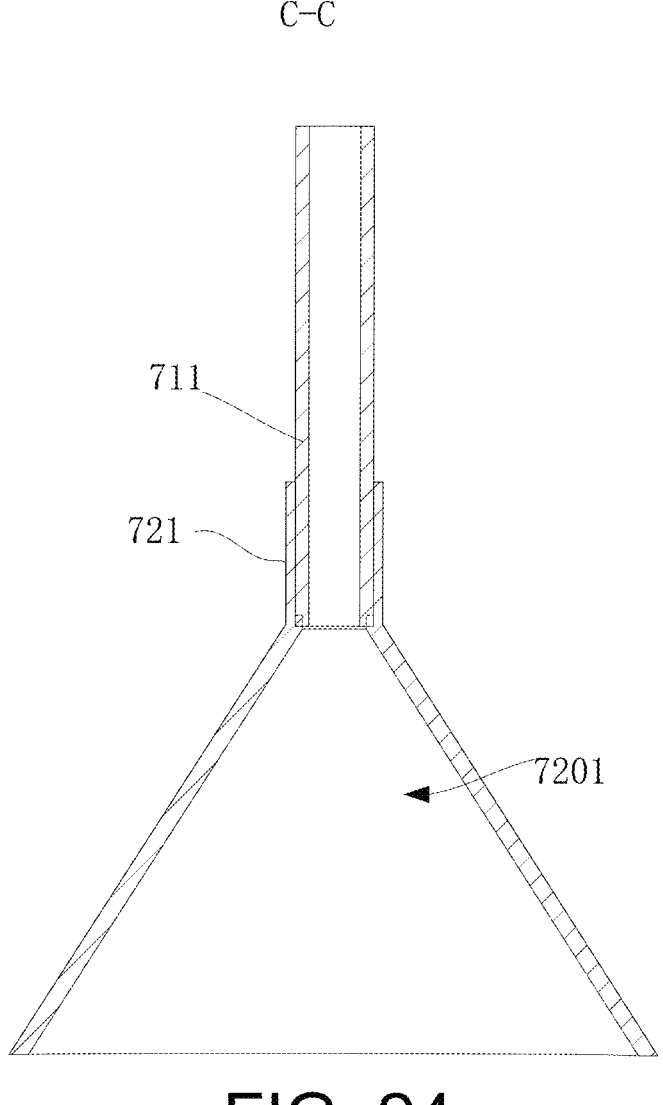
FIG. 24 is a sectional view taken along C-C in FIG. 23.

Referring to FIG. 23 and FIG. 24, in some embodiments of the present application, the nitrogen charging docking member 720 is detachably connected to the nitrogen charging pipe 711. A connecting end portion is provided at an end of the nitrogen charging docking member 720 connected to the nitrogen charging pipe 711. An internal thread is formed on an inner wall of the connecting end portion, an external thread is formed at an end portion of the nitrogen charging pipe 711, and the nitrogen charging pipe 711 is screwed into the connecting end portion.

In the process of charging nitrogen, the nitrogen charging robot 730 grips the nitrogen charging pipe 711 above the nitrogen charging docking member 720, and pulls the nitrogen charging pipe 711 down onto the pipe member 64. The pipe member 64 is guided into the nitrogen charging pipe 711 through the nitrogen charging docking member 720 to be connected to the nitrogen charging pipe 711, and then, the nitrogen charging apparatus 710 conveys the nitrogen into the pipe member 64.

In order to realize accurate guiding of the pipe member 64 into the nitrogen charging pipe 711, a minimum inner diameter in the docking channel is not greater than an inner diameter of the nitrogen charging pipe 711.

Figure 25:
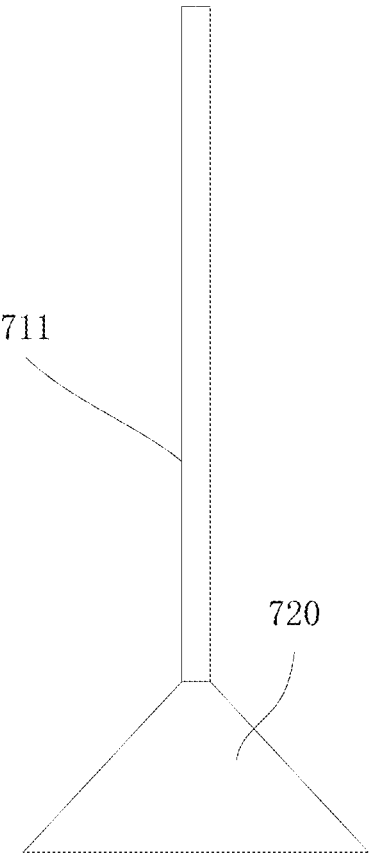
FIG. 25 is another schematic diagram showing a connection between the nitrogen charging docking member and the pipe member according to some embodiments.

Referring to FIG. 25, in some other embodiments, the nitrogen charging docking member 720 and the nitrogen charging pipe 711 are integrally formed, and the nitrogen charging docking member 720 is horn-shaped as a whole.

Figure 26:
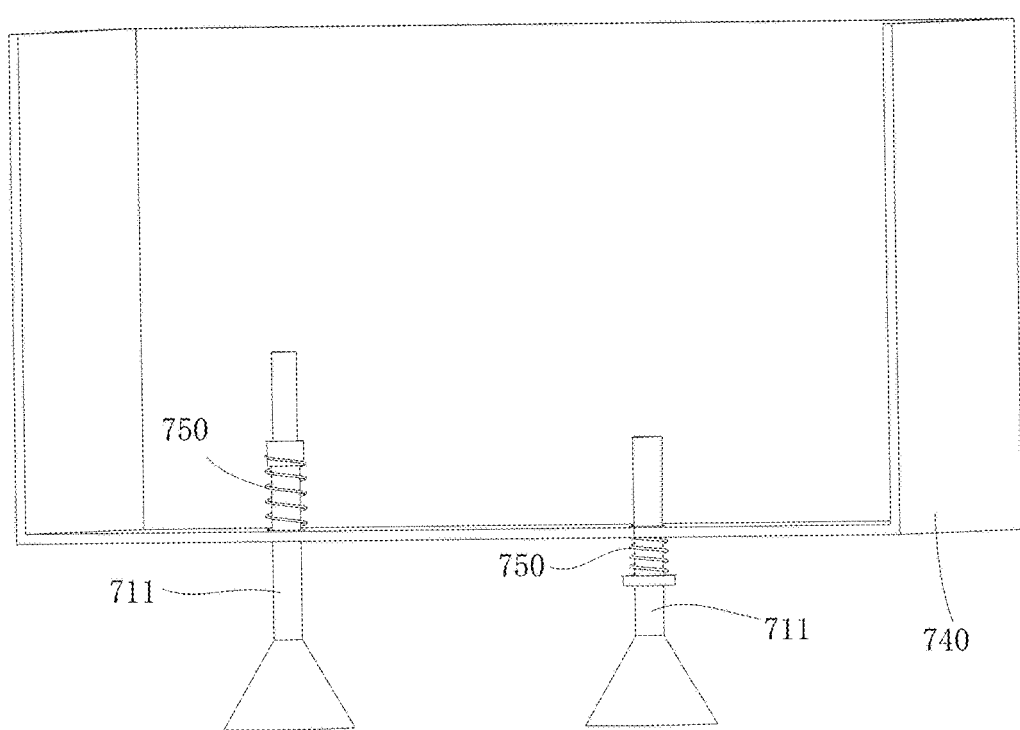
FIG. 26 is a schematic diagram showing a connection of an elastic member.

Referring to FIG. 26, in some other embodiments, in order to achieve the purpose that the nitrogen charging pipe 711 automatically resets upwards after nitrogen charging, an elastic member 750 is arranged between the nitrogen charging pipe 711 and the nitrogen charging room 740. One end of the elastic member 750 is fixed on an inner wall of the nitrogen charging room 740, and the other end of the elastic member is connected to the nitrogen charging pipe 711 in the nitrogen charging room 740. The elastic member 750 is compressed when the nitrogen charging pipe 711 moves outwards to be docked with the pipe member 64, and after nitrogen charging is completed, the nitrogen charging robot 730 releases the nitrogen charging pipe 711, and the elastic member 750 drives the nitrogen charging pipe 711 to move upwards and reset under a restoring force of the elastic member 750.

In some other embodiments, an elastic member 750 is arranged between the nitrogen charging pipe 711 and the nitrogen charging room 740. One end of the elastic member 750 is fixed on an outer side of the mounting port, and the other end of the elastic member 750 is connected to the nitrogen charging pipe 711 located outside the nitrogen charging room 740. The elastic member 750 is stretched when the nitrogen charging pipe 711 moves outwards to be docked with the pipe member 64, and after nitrogen charging is finished, the nitrogen charging robot 730 releases the nitrogen charging pipe 711, and the elastic member 750 drives the nitrogen charging pipe 711 to move upwards and reset under a restoring force of the elastic member 750.

In some other embodiments, the nitrogen charging pipe 711 is provided with an elastic pipe section for realizing telescopic movement of the nitrogen charging pipe 711 relative to the mounting opening.

The elastic pipe section is at least one section of the nitrogen charging pipe 711. The elastic pipe section is extended in the nitrogen charging state, and after nitrogen charging is finished, the elastic pipe section retracts under the elastic action of the elastic pipe section, so that the nitrogen charging docking member 720 moves upwards and resets.

Figure 22:
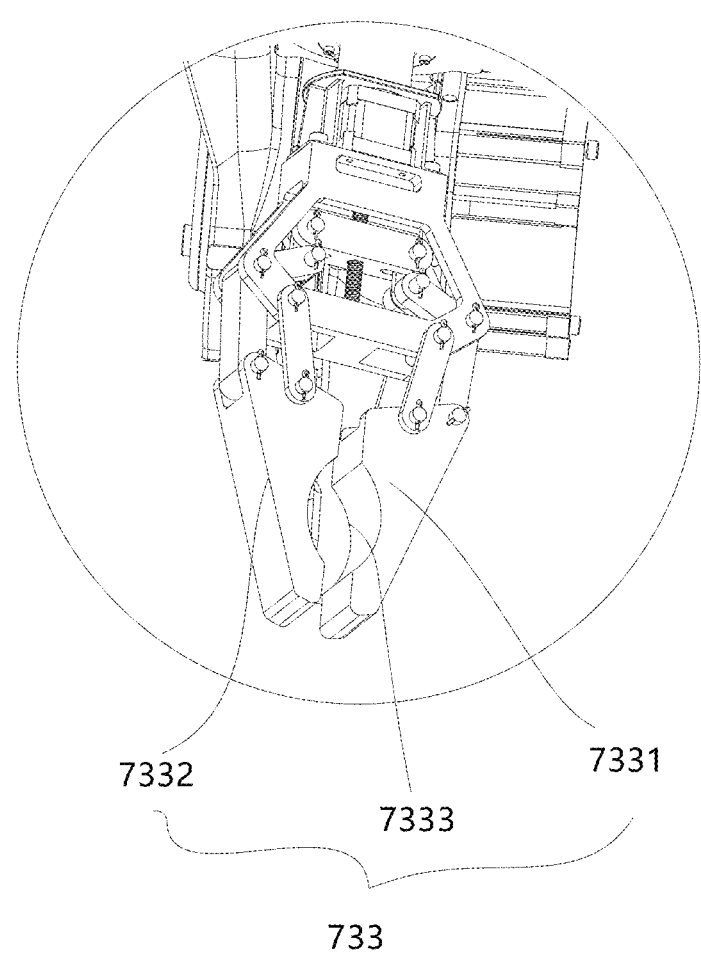
FIG. 22 is a structural view of a pipe gripper according to some embodiments.

Referring to FIG. 22, the nitrogen charging clamp 732 includes a clamping driving member and a clamping jaw assembly 733 connected to the clamping driving member. The clamping jaw assembly 733 includes a first clamping jaw 7331 and a second clamping jaw 7332 which are symmetrically arranged. A clamping recess 7333 is formed on each of the first clamping jaw 7331 and the second clamping jaw 7332. A size of the clamping recess 7333 is adapted to an outer diameter of the nitrogen charging pipe 711, and the nitrogen charging pipe 711 is configured to be clamped between the clamping recesses 7333.

Specific connections of the clamping driving member to the first clamping jaw 7331 and the second clamping jaw 7332 and implementation of opening and closing of the first clamping jaw 7331 and the second clamping jaw 7332 can be referenced from relevant technologies and will not be described herein.

Similarly, the nitrogen charging robot body 731 also includes a nitrogen charging robot base, a nitrogen charging robot upper arm and a nitrogen charging robot lower arm connected in sequence.

In addition, the nitrogen charging robot 730 also includes a robot motor and a vision camera. The nitrogen charging robot base is fixed to the ground, for example, through bolts, and the robot motor is connected to the nitrogen charging robot base, for example, through bolts. The nitrogen charging robot base, the nitrogen charging robot upper arm, and the nitrogen charging robot lower arm are connected through slip joints. The vision camera is arranged on the nitrogen charging clamp 732 and configured to acquire position information of the fin stack 60 and the positioning pin 62.

After nitrogen charging is completed, the fin conveying line 40 transports the fin stack 60 forward to the welding station for welding, and then, the fin stack is conveyed to a helium leak test station for welding state detection.

When the heat exchanger is an outdoor heat exchanger, after the helium leak test is finished, the fin stack 60 needs to be bent by a bending device 49, and finally, the heat exchanger is formed.

Steps of processing the fin stack 60 to form the heat exchanger are described below.

Firstly, an uncoiled aluminum sheet is placed on an uncoiling rack of the aluminum sheet uncoiler, a coiled aluminum sheet tip is placed in the middle of an uncoiling roller, and then, a motor is started, the aluminum sheet is uncoiled, and the uncoiled aluminum sheet is fed into the stamping press.

In the stamping press, various processes are performed. Straightening and oiling are performed in a first step. A strip material (i.e., the uncoiled aluminum sheet) is straightened by a roller group and enters an oil immersion tank. A pair of roller shafts are arranged at an outlet of the oil immersion tank to remove dust and redundant grease on a surface of the strip, so as to form a uniform oil film on the surface of the strip, which facilitates lubrication and punching of a die.

In a second step, material pulling is performed. A material pulling mechanism is integrated with a main machine. A stamping spindle is connected to the die through a toothed belt, a toothed axle, a sliding plate, a pull rod, a rocking plate and a material pulling shaft, so as to ensure that material pulling and spindle stamping are synchronous. A material pulling pitch can be precisely set by adjusting lengths of the sliding plate and the pull rod.

In a third step, cutting counting is performed. Cutting is performed by upper and lower cutting blades and a cylinder controlled by a contactless cam controller 70, and a number of actions is recorded.

Finally, discharging is performed, and the stamped fins fall at a specified position.

The heat exchanger fins are stamped under the punching action of the die in the sheet punching machine. A length of each fin ranges from 500 mm to 1,000 mm, a width of each fin ranges from 50 mm to 100 mm, a thickness of each fin ranges from 0.2 mm to 0.5 mm, a distance between the fins ranges from 8 mm to 12 mm, and sizes thereof can be determined by a size of the die.

A stamping process of the fin stamping press is prior art and is not a design focus of the application. It is briefly described in consideration of the completeness of the technical solution.

The fin stamping press pushes out the fins 30, the fins 30 are discharged onto the fin stacking pins, and then, a positioning pin inserting robot inserts the positioning pins 62.

The positioning pin inserting robot clamps the positioning pins 62 and inserts the positioning pins into corresponding insertion holes of the fins. The vision camera (RGB-D camera, which can provide RGB image and depth information) of the positioning pin inserting robot takes pictures, and the obtained pictures are recognized, processed and positioned by a central processing unit, so that the positioning pins 62 can be conveniently inserted.

After the plurality of positioning pins 62 are inserted, the aluminum sheets (i.e., the fin stack) constituting the heat exchanger can still move in a vertical direction, but movement in the X-axis direction, movement in the Y-axis direction, rotation around the X-axis, rotation around the Y-axis, and rotation around the Z-axis are already limited by the positioning pins 62, that is, movement in the Z-axis direction is not limited.

After the positioning pin 62 is inserted, the feeding robot 450 is started. A mechanical arm of the feeding robot 450 stops the clamp thereof at a specified position, and the clamp is aligned with the fin stack to be gripped. When the feeding clamp 452 contacts the fin stack, movement of the feeding clamp is subjected to certain resistance, and when the resistance reaches a certain value, the clamping power member stops moving, the fin stack is clamped in this case, and then, the feeding robot upper arm 4512 drives the feeding robot lower arm 4513 to move to place the fin stack on the fin conveying line 40.

When mounting the end plate member 63, the end plate mounting robot upper arm drives the end plate mounting robot lower arm to grip an end plate from the rear through the end plate clamp 513, and then, the vision camera on the end plate mounting robot takes pictures, the vision camera identifies positions of the positioning pins 62 and the insertion holes. A processor of the end plate mounting robot controls the arms thereof to lift the end plate member 63 to a proper height to align the end plate member 63 with a side portion of the fin stack 60. After the end plate member 63 is inserted into the fin stack 60 with the positioning pins 62, the end plate clamp 513 is released, and then, the pushing end portion is slowly pushed out to push the end plate member 63.

In transportation of the heat exchanger, in an existing solution, two sides of the heat exchanger are gripped, but in the gripping process, a clamping force is not strictly kept, making the heat exchanger prone to deformation. In the present application, the end plates at the two sides of the heat exchanger are gripped, and a shape of the heat exchanger is better ensured.

The fin conveying line 40 transports the fin stack 60 to a next process position, and the clamp used by the pipe inserting robot 610 is consistent with that of the positioning pin inserting robot. First, the robot grips the pipe member 64 from a rear raw material region, and then, the robot clamp moves to the vicinity of the two sides of the heat exchanger, the vision camera takes pictures, the pipe member 64 is slowly inserted into the heat exchanger according to the positioning method and the method for maintaining the clamping force described above, and after the insertion is completed, the clamp is released.

After the pipe inserting is completed, the pipe inserting robot 610 pushes the positioning pins 62 out of the heat exchanger, and in this case, the inserted pipe member 64 positions and restrains the fins of the heat exchanger in place of the positioning pins 62, and also limits the movement in the X-axis direction, the movement in the Y-axis direction, the rotation about the X-axis, the rotation about the Y-axis, and the rotation about the Z-axis.

After the pipe inserting robot 610 pushes out the positioning pin 62, the pipe inserting robot 610 grips a pipe member 64 from the raw material region, and repeats the above process to insert the pipe member 64 into the insertion hole from which the positioning pin 62 is pushed out.

After the pipe inserting is completed, the transfer robot 45 transports the heat exchanger to the pipe expansion station for the pipe expansion operation.

A pipe expander is a special device for tightly fixing a metal pipe and a pipe plate, and is widely applied to the fields of cooling, heat exchangers, boilers, or the like. The pipe expander has a core principle that the pipe is expanded in a mechanical or hydraulic manner, so that the pipe and a hole wall of the pipe plate generate plastic deformation to form interference fit, thereby ensuring a sealing performance and connection strength. A hydraulic pipe expander is adopted in the present application, and has a working principle that hydraulic oil is injected into the pipe, a pipe wall is uniformly expanded through a pressure of the liquid to be attached to a pipe plate hole, and a pressure value can be accurately controlled.

Firstly, a hydraulic head of the pipe expander is inserted into the pipe and positioned at the pipe plate hole. Then, a hydraulic pump is started to inject high-pressure oil into the pipe, and the pipe wall is uniformly expanded to be attached to the pipe plate hole. After the pipe expansion is finished, the hydraulic pipe expander needs to pull out the hydraulic head after pressure relief.

After the pipe expansion is completed, the transfer robot 45 transfers the fin stack 60 to the drying station for drying.

A dryer starts to operate. The dryer is configured to dry lubricating oil in the heat exchanger. During subsequent use, if the lubricating oil is not dried, the lubricating oil can be evaporated into the air to injure the human body.

First, the dryer pre-cleans the heat exchanger by spraying warm water, so as to remove the large-particle lubricating oil attached to the surface of the heat exchanger to lower a main degreasing burden, and then, main degreasing is performed. 1. Spraying degreasing: a spraying system uniformly covers the surface of the workpiece (i.e., the heat exchanger) with degreasing fluid under a pressure of 0.3-0.8 MPa for 5-15 minutes. 2. Temperature control: a degreasing tank is heated to 50-70° C. (alkaline degreasing). 3. Circulating filtering: the degreasing fluid is recycled after impurities are removed by a filter screen or a centrifugal machine, so that a service life is prolonged.

After degreasing, multi-stage rinsing is performed. A residual degreasing agent is washed away by hot water (60-80° C.) in first-stage rinsing to avoid crystallization. Normal temperature water is used in secondary rinsing to further remove trace residues, and a neutral pH value is ensured. Then, drying by hot air is performed, and a component is quickly dried by hot air at 80-120° C. to prevent water stain residues.

The degreasing agent for the pipe member 64 is a neutral degreasing agent or alkalescent degreasing agent, so as to avoid corrosion.

After the drying operation is completed, the fin stack 60 is sent out from a tail end of the dryer along with the fin conveying line 40, and in this case, another transfer robot 45 completes a feeding process of the fin stack 60 according to the above flow.

In a next step, the bent pipe is inserted. Processes of the outdoor heat exchanger and an indoor heat exchanger are different. For the outdoor heat exchanger, bending is required in the last step, so that in the process of inserting the bent pipe, the aluminum sheets forming the heat exchanger have a certain height difference, and the bent pipe needs to be inclined by a certain angle when inserted. For the indoor heat exchanger, bending is not required, so that the height difference does not exist.

The robot for inserting the bent pipe is the same as the pipe inserting robot 610, a positioning method and keeping of a clamping force thereof are consistent with the above description. When an elbow is inserted, since there is a height difference, the robot clamp is set to have certain inclination, which is related to the height difference of the heat exchanger.

After the above operation is completed, the heat exchanger is filled with the nitrogen in a next step. The main purpose of nitrogen charging before welding is to prevent an inner wall of the pipe member 64 from generating scale at a high temperature. The nitrogen is chemically stable and can isolate the pipe member 64 from oxygen, thereby avoiding that the pipe member 64 is subjected to an oxidation reaction to generate oxide during the welding process.

The vision camera on the nitrogen charging robot 730 takes pictures of the fin stack 60 to determine a position of a port of a pipe member 64 which needs to be charged with nitrogen, and then, the nitrogen charging clamp 732 is controlled to clamp the nitrogen charging pipe 711 and pull it down to connect with the pipe member 64. The nitrogen charging pipe 711 is telescopic, the nitrogen charging docking member 720 is aligned with the pipe member 64 port, and then, the nitrogen charging is performed. After the nitrogen charging is finished, the nitrogen charging clamp 732 clamps and takes out the nitrogen charging pipe 711 from the pipe member 64 port.

The heat exchanger is continuously transported to the welding device 47 through the conveying belt. In the bent pipe inserting process, the bent pipe is provided with brazing filler metal, the automatic welding device 47 only needs to weld for 3-5 seconds to melt the brazing filler metal, the welding is finished under control of a control cabinet of the automatic welding device 47, and a temperature range is 180-250° C.

After welding is completed, the helium leak test is performed. Before the helium leak test, the protective nitrogen charged in the previous process is firstly removed, and then, helium is injected, and the process is consistent with the nitrogen charging process.

Helium is inert gas and is often used for test. Since helium molecules are small and easily pass through narrow gaps, a helium mass spectrometer is arranged in a helium leak test room to monitor a helium concentration change in the surrounding environment, and meanwhile, a sensor is arranged, so that leakage points can be accurately positioned.

After the helium leak test, bending is further required for the outdoor heat exchanger. A bending machine bends the fin stack 60 by 90 degrees, thus the heat exchanger is bent into an L shape, and then, the production process of the heat exchanger is completed.

After the heat exchanger is processed, the heat exchanger is mounted on a bottom plate of an air conditioner, and after the heat exchanger is mounted, a surface of the heat exchanger is sprayed.

Figure 27:
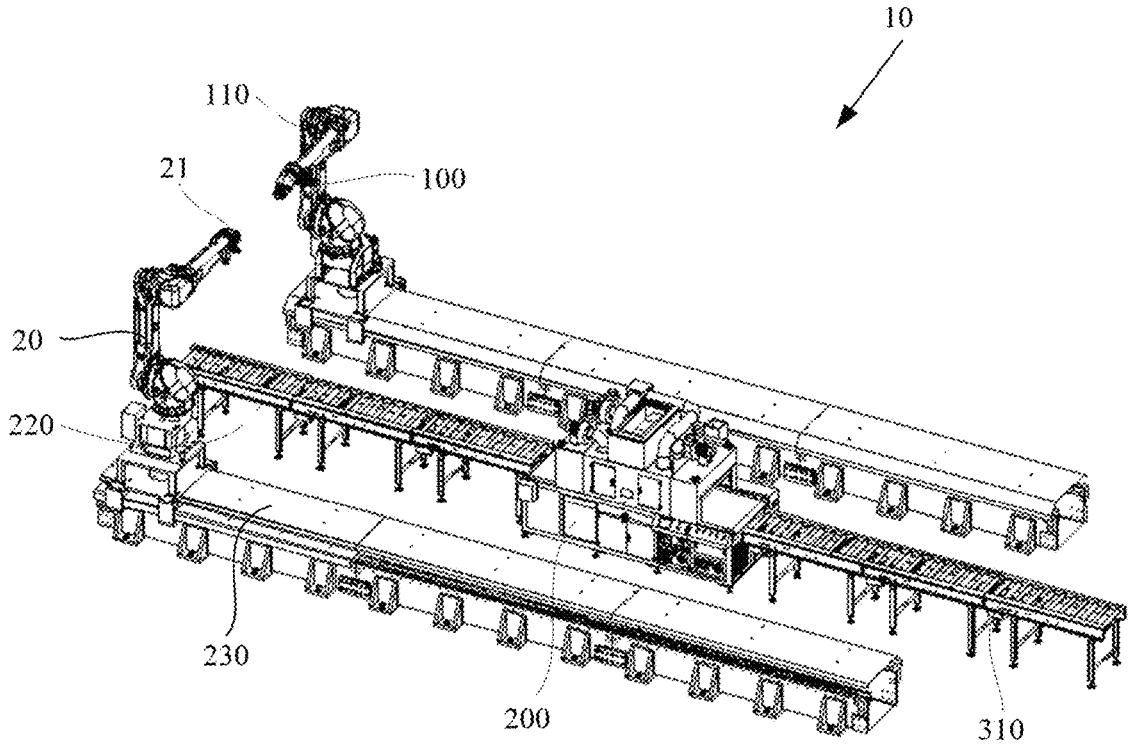
FIG. 27 is a structural diagram of a heat exchanger spray station according to some embodiments.
Figure 28:
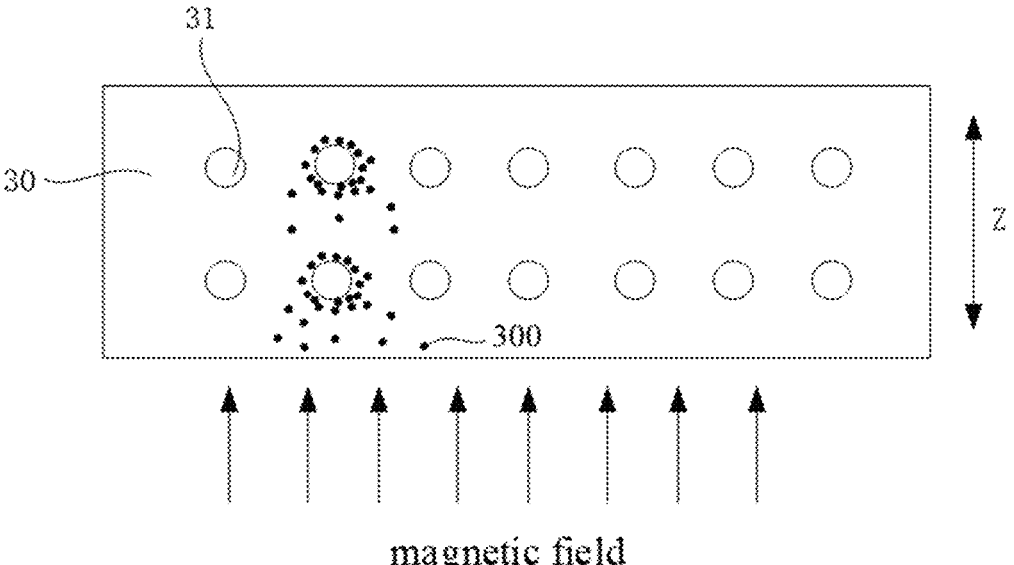
FIG. 28 is a schematic diagram of distribution of capsule portions on a fin according to some embodiments.

Referring to FIG. 27 and FIG. 28, a heat exchanger spray system 10 includes a spray robot 20. A tip of a mechanical arm of the spray robot 20 is provided with a spray head 21, and the spray head 21 is configured to perform spraying on the fins 30. The ground is provided with a first guide rail 230, and the spray robot 20 moves along the first guide rail 230.

During spraying, the spray head 21 is located on one side of the heat exchanger and sprays a coating from one side of the heat exchanger to the other side. A spray region is controlled by controlling parameters such as a range and amplitude of movement of the spray head 21, a spray pressure of the spray head 21, and a distance between spray head 21 and the heat exchanger.

The spray head 21 is a two-fluid atomization spray head, a diameter of the spray head is 0.3 mm, a diameter of atomized particles is ensured to be less than or equal to 10 μm, and the surface of the fin 30 is ensured to be uniformly covered by the coating.

The spray system further includes a coating tank configured to supply the coating to the spray head 21. A capsule portion 300 is mixed in the coating, and the capsule portion 300 is filled with a repair agent.

The spray system further includes a vision apparatus 100, which is configured to obtain image information of the heat exchanger.

The spray system further includes a control system in communication with the spray robot 20 and the vision apparatus 100. The control system is configured to analyze the image information of the heat exchanger to obtain size information of the heat exchanger for controlling movement of the spray head 21.

The spray system further includes a magnetic field generating apparatus 220, and the magnetic field generating apparatus 220 is configured to emit a magnetic field towards the heat exchanger.

The capsule portion 300 is configured to move towards the insertion hole 31 under the action of the magnetic field, and the capsule portion 300 is further configured to break under the action of an external force to release the internal repair agent, so as to perform coating repair on the fin 30.

Specifically, the coating sprayed out from the spray head 21 has a repairing function, the capsule portion 300 is mixed in the coating, and the capsule portion 300 is filled with the repair agent containing siloxane and a catalyst.

An outer diameter of the capsule portion 300 is nano-scale, and a particle size of the capsule portion 300 is 5-20 μm. FIG. 28 is a structural view of the capsule portion 300. An outer shell of the capsule portion 300 has a spherical core-shell structure, so as to ensure uniform stressing under the action of the magnetic field.

The capsule portion 300 is made of ferroferric oxide and silicon dioxide. In the capsule portion 300, ferroferric oxide nano particles are adopted to be covered with the silicon dioxide by a sol-gel method to form the core-shell structure. The ferroferric oxide causes the capsule portion 300 to have high magnetic susceptibility, which is convenient for accurately controlling a motion track through the external magnetic field. The silicon dioxide causes the capsule portion 300 to have chemical inertness and certain mechanical strength, protects an inner core from environmental corrosion, and meanwhile regulates and controls an outer shell rupture threshold by adjusting a crosslinking degree.

The repair agent is encapsulated in an inner cavity of the capsule portion 300 by a micro-fluidic technology. When a crack is formed in the fin 30 due to corrosion or mechanical load, a high-stress region is formed at a tip of the crack, and when local stress, tensile stress, shear stress, or the like, generated by crack propagation exceed the mechanical strength threshold of the outer shell of the capsule portion 300, the outer shell of the capsule portion 300 is broken and the repair agent is released.

The mechanical strength and sensitivity of the outer shell are balanced by regulating and controlling a thickness and the crosslinking degree of the outer shell of the capsule portion 300 or adding a toughening agent. The capsule portion 300 is embedded in a region of the coating of a root of the fin 30 prone to be subjected to stress concentration to improve a trigger efficiency.

The magnetic field generating apparatus 220 is an electromagnetic array apparatus that generates a gradient magnetic field, and the capsule portion 300 is magnetically driven in the magnetic field and gathered in the root (i.e., the position of the insertion hole 31) region of the fin 30 having high magnetic field strength. A formula is as follows:

$$F=\nabla(M \times B)$$

where F is a magnetic force (unit: N) for driving the capsule portion to move, M is magnetization intensity (unit: A/M) of the capsule portion 300, and B is magnetic induction intensity (unit: T) for generating the gradient magnetic field by the electromagnetic array apparatus.

The electromagnetic array apparatus adjusts the magnetic field gradient according to the fin gap, so as to ensure that the capsule portion 300 is limited to be deposited in the root region of the fin 30 which is easy to corrode. The magnetic field regulation satisfies the following formula:

$$\nabla B=k/d2$$

where $\nabla B$ is the magnetic field gradient (unit: T/m), k is a material-process coefficient (unit: T·m²), and d is a fin gap width, i.e., a minimum distance between adjacent fins (unit: m).

When the fin 30 is processed, a flange is formed on a periphery of the insertion hole 31, and a distance between two adjacent fins 30 at the insertion holes 31 is smallest due to the existence of the flanges, so that the magnetic field intensity at the insertion hole 31, namely, the root of the fin 30, is maximum, and therefore, the capsule portion 300 can move towards the insertion hole 31 under the action of the magnetic field to be deposited near the insertion hole 31.

The root of the fin 30 is a position where corrosion is likely to occur, and after the fin 30 is corroded, cracks are formed on the surface, and when the local stress, tensile stress, shear stress, or the like, generated by crack propagation exceed the mechanical strength threshold of the outer shell of the capsule portion 300, the outer shell of the capsule portion 300 is broken, and the repair agent is released to repair the corroded position of the fin 30.

In some embodiments of the present application, the spray head 21 is located at one side of the heat exchanger, and the spray head 21 moves along the length direction X of the heat exchanger and the width direction Y of the heat exchanger along a sine wave trajectory. Compared with a traditional sectional spray mode, the spray path has a higher efficiency.

In some embodiments of the present application, when the spray head 21 moves along the Y direction, the spray head 21 swings back and forth along the Y direction, and a swing amplitude of the spray head 21 is positively correlated with the gap between two adjacent fins 30. A formula is as follows:

$$A=k_A \cdot \sqrt{d}$$

where A is a transverse swing amplitude (unit: mm) of the spray head 21, $k_A$ is a proportionality coefficient (without unit), and d is the gap of the fins 30, i.e., the minimum distance (unit: mm) between adjacent fins 30. The smaller the gap between the fins 30, the lower the swing amplitude of the spray head portion 21, so as to avoid clogging of the gap with the coating.

A lower limit value of the swing amplitude of the spray head 21 is 0.5 mm, and is suitable for a dense region with d less than or equal to 0.8 mm.

An upper limit value of the swing amplitude of the spray head is 3.0 mm, and is suitable for a sparse region with d more than or equal to 2.5 mm.

In some embodiments of the present application, when the spray head 21 moves along the Y direction, the spray head 21 swings back and forth along the Y direction, and a swing frequency of the spray head 21 is positively correlated with a density of the fins 30. A formula is as follows:

$$f=kf \cdot \rho$$

where f is the swing frequency of the spray head 21 (unit: hz), kf is a density-frequency coefficient (unit: hz mm/fin), and ρ is the density of the fins 30, i.e., a number of the fins 30 per unit length (unit: fin/mm). The higher the density of the fins 30, the higher the swing frequency of the spray head 21, so as to improve a spray coverage efficiency.

As a spray pressure increases, the swing frequency of the spray portion increases synchronously to match an atomized particle output rate.

A swing fundamental frequency of the spray head 21 is 5 Hz, and is suitable for a sparse region with ρ less than or equal to 10 fins/cm.

An upper limit of the swing frequency of the spray head 21 is 20 Hz, and is suitable for a dense region with ρ more than or equal to 30 fins/cm.

In some embodiments of the present application, the heat exchanger has a straight region and a bent region, and spray head 21 sprays the straight region and the bent region separately.

In other words, for the U-shaped heat exchanger, the spray head 21 performs region-based spraying on the heat exchanger, for example, the straight region is sprayed first, and then, the bent region is sprayed. When the spray head 21 passes through the bent region, the spray head 21 generates an arc-shaped or polygonal-line detouring path along an outer edge of the bent region, so that the spray head 21 is ensured to keep a preset safety distance from the bent region.

In some embodiments of the present application, a moving path of the spray head 21 is located within a projection range of the heat exchanger, and the spray head 21 reduces a moving speed and the swing amplitude when approaching a boundary of the heat exchanger.

In other words, the vision apparatus 100 identifies a boundary of the fin 30 in real time to generate a dynamic spray restricted region. The moving path of the spray head portion 21 is strictly limited within the projection range of the fin 30, and a gradient deceleration strategy is adopted for an edge region, so that the moving speed is decreased and the amplitude is reduced when the spray head is close to the boundary, and the coating is prevented from sputtering.

In some embodiments of the present application, the heat exchanger spray system 10 further includes a UV curing apparatus 200 configured to perform coating curing on the sprayed heat exchanger. The UV curing apparatus 200 is prior art, and is not repeated herein.

The heat exchanger spray system 10 further includes a spray conveying line 240, the magnetic field generating apparatus 220 and the UV curing apparatus 200 are spaced apart along a length direction of the spray conveying line 240, and the magnetic field generating apparatus 220 generates a magnetic field for the heat exchanger placed on the spray conveying line 240.

In some embodiments of the present application, the spray process of the heat exchanger spray system 10 includes the following steps.

The vision apparatus 100 acquires point cloud data of the fins 30 of the heat exchanger, and extracts topological parameters such as inclination angles, distances and heights of the fins 30.

A space topological relationship model of the fins 30 is constructed based on a graph neural network (GNN) to generate surface curvature distribution and gap width data of the fins 30.

The spray path is decomposed as follows according to the model: "the spray head 21 swings and sweeps along the width direction X of the heat exchanger while moving along the length direction X of the heat exchanger", the spray head 21 moves along the length direction X of the heat exchanger in the sine wave trajectory, the amplitude and the frequency of the spray head 21 are adaptively adjusted by the gap of the fins 30, and the coating is ensured to permeate into the roots of the fins 30 without clogging the gap.

A compressed air pressure of the spray head 21 is adjusted in real time through a PID algorithm to be suitable for regions with different fin 30 densities. The pressure is increased in the dense region, and the pressure is reduced in the sparse region.

A mass flow meter 110 monitors a flow rate of the coating in real time, and if a deviation exceeds ±5%, an alarm is triggered, spraying is suspended, and an MES system records the abnormality.

The spray robot 20 moves along a planned path of the first guide rail 230, and the spray head 21 sprays atomized particles with a diameter of 0.3 mm to uniformly cover the surface of the fin 30.

After the spraying is completed, the heat exchanger enters the UV curing apparatus 200, and is irradiated for 30 seconds under a 365 nm wavelength and 500 W/m² power to complete crosslinking curing of the coating.

Spray parameters (coating thickness, repair agent content, or the like) are uploaded to an Internet of things platform through an OPC UA protocol and bound with the MES system, so that quality tracing of a whole life cycle is realized.

Figure 29:
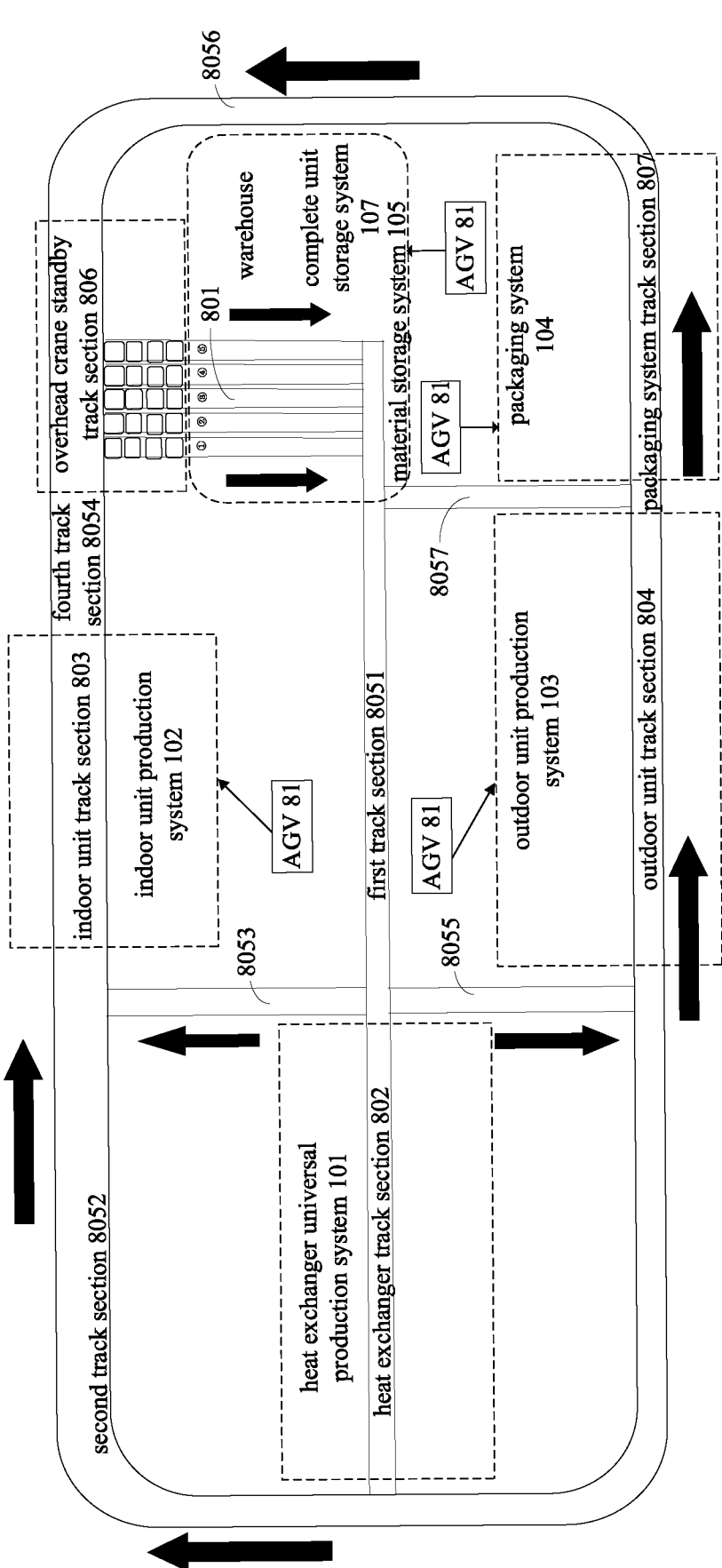
FIG. 29 is a schematic layout diagram of an air-conditioner full-automatic intelligent operation and maintenance system according to some embodiments.
Figure 30:
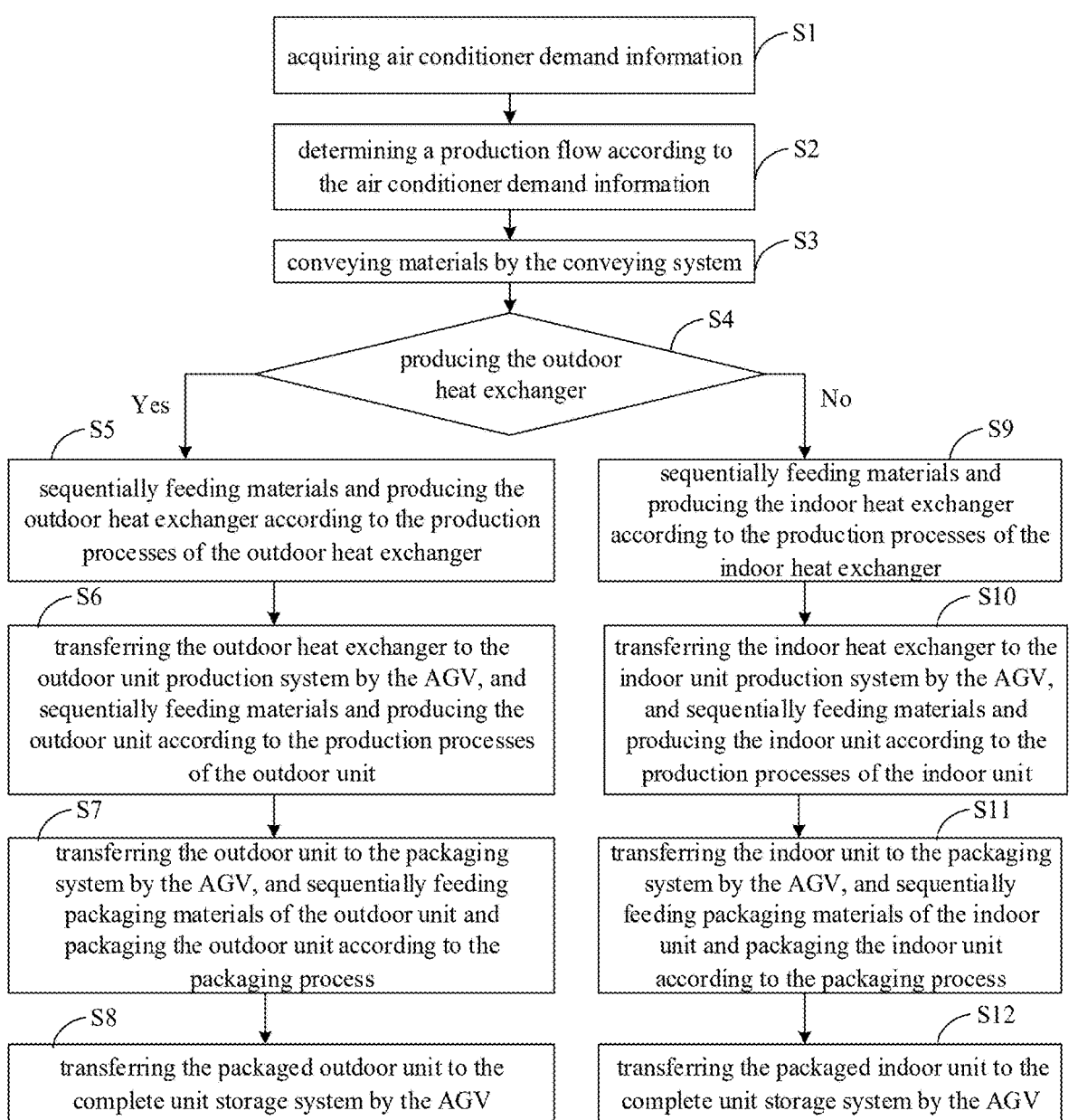
FIG. 30 is a flow chart of an air-conditioner full-automatic intelligent production method according to some embodiments.

Referring to FIG. 29 to FIG. 30, the heat exchanger produced by the above heat exchanger production system is also used in an air-conditioner full-automatic intelligent operation and maintenance system.

The air-conditioner full-automatic intelligent operation and maintenance system includes a heat exchanger universal production system 101, an indoor unit production system 102, an outdoor unit production system 103, a material storage system 105, a conveying system and a control system (not shown in the figures).

The heat exchanger universal production system 101 is configured to produce heat exchangers.

The heat exchanger universal production system 101 includes an indoor heat exchanger fin production unit, an outdoor heat exchanger fin production unit and a plurality of indoor and outdoor heat exchanger universal production units.

The indoor heat exchanger fin production unit is configured to produce indoor heat exchanger fins.

The outdoor heat exchanger fin production unit is configured to produce outdoor heat exchanger fins.

Since specifications of the indoor heat exchanger fins and the outdoor heat exchanger fins are different, fin production units are divided into the indoor heat exchanger fin production unit and the outdoor heat exchanger fin production unit.

The specifications of the fins may include, for example, fin lengths, fin hole distances, etc.

A pipe bending unit of the universal production unit includes a first cutting station and a second cutting station. The first cutting station is configured for cutting outdoor heat exchanger pipes, and the second cutting station is configured for cutting indoor heat exchanger pipes.

An operation frequency of a pipe expansion unit of the universal production unit includes a first frequency and a second frequency. The first frequency is configured for producing outdoor heat exchangers, and the second frequency is configured for producing indoor heat exchangers.

The plurality of indoor and outdoor heat exchanger universal production units are configured to produce unbent outdoor heat exchangers by using the outdoor heat exchanger fins and heat exchanger materials and produce the indoor heat exchangers by using the indoor heat exchanger fins and heat exchanger materials.

The indoor unit production system 102 is configured to produce indoor units by using the indoor heat exchangers and indoor unit materials. The indoor unit production system includes a plurality of indoor unit production units.

A bending unit is configured to bend the unbent outdoor heat exchanger into the outdoor heat exchanger.

The outdoor unit production system 103 is configured to produce outdoor units by using the outdoor heat exchangers and outdoor unit materials.

The outdoor unit production system 103 includes a plurality of outdoor unit production units.

The bending unit is located in the outdoor unit production system and controlled by the outdoor unit production system.

In some embodiments, the bending unit may be located in the indoor unit production system and controlled by the indoor unit production system.

The material storage system 105 is configured to store the heat exchanger materials, the indoor unit materials and the outdoor unit materials.

The conveying system is configured to convey the heat exchanger materials to the heat exchanger universal production system, convey the indoor unit materials to the indoor unit production system and convey the outdoor unit materials to the outdoor unit production system.

The control system is communicated with the heat exchanger universal production system, the indoor unit production system, the outdoor unit production system, the material storage system and the conveying system. The control system is configured to coordinate and control running states of all the systems in a unified way and acquire related information of all the systems.

The control system is configured to control the conveying system to convey materials, control the indoor heat exchanger fin production unit and the universal production unit to produce the indoor heat exchanger, control the indoor unit production system to produce the indoor unit from the indoor heat exchanger and the indoor unit materials, control the outdoor heat exchanger fin production unit, the universal production unit, and the bending unit to produce the outdoor heat exchanger and control the outdoor unit production system to produce the outdoor unit from the outdoor heat exchanger and the outdoor unit materials.

The indoor heat exchanger and the outdoor heat exchanger are produced through the heat exchanger universal production system 101, and the heat exchanger universal production system 101 is controlled to produce the outdoor heat exchanger or the indoor heat exchanger according to production requirements of the indoor unit and the outdoor unit, thus effectively reducing a space layout and a layout cost of the whole production system.

In some embodiments, each of the heat exchanger universal production system 101, the indoor unit production system 102 and the outdoor unit production system 103 includes a sub-control system. The sub-control systems are configured to be communicated with the control system to perform data transmission interaction, and the sub-control systems are configured to receive detection information of respective production units and control working states of respective related production units.

Each sub-control system processes the data and then uploads the processed data to the control system, so that an information transmission quantity and an operation pressure of the control system can be reduced.

In some embodiments, the heat exchanger universal production system includes a heat exchanger sub-control system, the indoor unit production system includes an indoor unit sub-control system, and the outdoor unit production system includes an outdoor unit sub-control system.

In some embodiments, the conveying system includes a conveying sub-control system in communication with the control system.

In some embodiments, the conveying system is not provided with the control system, but is managed and controlled by a material management system.

The conveying system includes an overhead crane system. In some embodiments, the indoor unit production system and the outdoor unit production system are arranged side by side between the heat exchanger universal production system and the material storage system.

In the example of FIG. 1, in a production line direction, the heat exchanger universal production system, the indoor unit production system and the outdoor unit production system arranged side by side, and the material storage system are arranged in sequence.

The indoor unit production system and the outdoor unit production system are arranged downstream of the heat exchanger universal production system side by side, so as to facilitate the heat exchanger to be respectively conveyed to the indoor unit production system and the outdoor unit production system.

A track includes a material track section 801, a heat exchanger track section, an indoor unit track section, an outdoor unit track section and first to sixth track sections.

The material track section is located above the material storage system, the heat exchanger track section is located above the heat exchanger universal production system, the indoor unit track section is located above the indoor unit production system, and the outdoor unit track section is located above the outdoor unit production system.

The first track section 8051 is connected to the material track section and the heat exchanger track section 802, and the first track section 8051 is located between the indoor unit track section 803 and the outdoor unit track section 804.

The second track section 8052 is connected to the heat exchanger track section 802 and the indoor unit track section 803.

The third track section 8053 is connected to the first track section 8051 and the indoor unit track section 803.

The fourth track section 8054 is connected to the indoor unit track section 803 and the material track section.

The fifth track section 8055 is connected to the first track section 8051 and the outdoor unit track section 804.

The sixth track section 8056 is connected to the outdoor unit track section 804 and the material track section.

An overhead crane is configured to run to the material track section to grip a material box in which the heat exchanger material is placed, reach the heat exchanger track section 802 through the first track section 8051, release the heat exchanger material to the heat exchanger universal production system 101, and then reach the fourth track section 8054 through the second track section 8052 and the indoor unit track section 803. The overhead crane is configured to run to the material track section to grip a material box in which the indoor unit material is placed, reach the indoor unit track section 803 through the first track section 8051 and the third track section 8053, release the indoor unit material to the indoor unit production system 102, and then reach the fourth track section 8054. The overhead crane is configured to run to the material track section to grip a material box in which the outdoor unit material is placed, reach the outdoor unit track section 804 through the first track section 8051 and the fifth track section 8055, release the outdoor unit material to the outdoor unit production system 103, and then reach the sixth track section 8056.

In some embodiments, the track includes an overhead crane standby track section 806 located between the fourth track section 8054 and the material track section and between the sixth track section 8054 and the material track section.

The fourth track section 8054 may or may not be connected to the sixth track section 8056.

The overhead crane is configured to reach the overhead crane standby track section 806 after material conveying is finished, so as to be on standby on the overhead crane standby track section 806.

In some embodiments, the material storage system includes a material management system for managing material information, and the material management system is in communication with the control system to upload the material information to the control system.

In the example of FIG. 29, the air-conditioner full-automatic intelligent operation and maintenance system further includes a packaging system 104 for receiving and packaging the indoor unit and the outdoor unit. The overhead crane system is configured to convey packaging materials to the packaging system.

The packaging materials include indoor unit packaging materials and outdoor unit packaging materials, and the indoor unit packaging materials and the outdoor unit packaging materials can be synchronously or respectively conveyed to the packaging system. A ground transfer apparatus is configured to convey the indoor unit and the outdoor unit to the packaging system.

The control system determines whether the indoor unit or the outdoor unit is to arrive at the packaging system according to production states of the outdoor unit production system and the indoor unit production system, and sends related information to the packaging system. When the indoor unit reaches the packaging system, the packaging system feeds the indoor unit packaging material and packages the indoor unit, and when the outdoor unit reaches the packaging system, the packaging system feeds the outdoor unit packaging material and packages the outdoor unit.

In some embodiments, the packaging materials are stored in the material storage system 105.

In some embodiments, the packaging system 104 is located below the sixth track section 8056 of the conveying system, and the material track section and the sixth track section 8056 are connected by the seventh track section 8057.

The overhead crane is configured to run to the material track section to grip a material box where the packaging material is placed, and release the packaging material to the packaging system 104 when reaching a position of the sixth track section 8056 above the packaging system 104 through the seventh track section 8057, and then reach the overhead crane standby track section.

In some embodiments, the packaging system 104 is located downstream of the outdoor unit production system 103, and the material storage system 105 is located downstream of the indoor unit production system 102.

The seventh track section 8057 of the conveying system is located between the outdoor unit production system 103 and the packaging system 104.

Such a layout mode enables a structural layout of the whole production system to be more reasonable, and material conveying to be smoother, and a production efficiency can be improved.

The full-automatic intelligent production system also includes a complete unit storage system for storing the complete unit which is packaged by the packaging system.

In some embodiments, the complete unit storage system and the material storage system are two independent systems.

The complete unit storage system includes a complete unit warehousing information acquisition unit and a complete unit management system.

The complete unit warehousing information acquisition unit is configured to acquire complete unit warehousing information and send the complete unit warehousing information to the complete unit management system.

The complete unit management system is configured to manage complete unit information and is communicated with the control system to upload the complete unit information to the control system.

In some embodiments, the ground transfer apparatus is configured to convey the complete unit packaged by the packaging system to the complete unit storage system.

In some embodiments, the ground transfer apparatus is an AGV.

In some embodiments, the packaged complete unit is also stored in the material storage system, and the material management system is configured to manage the complete unit information and uploading the complete unit information to the control system.

In some embodiments, the material storage system for storing the complete unit forms a warehouse.

The warehouse, the heat exchanger universal production system, the indoor unit production system, the outdoor unit production system, and the packaging system are arranged to form an assembly production line. The overhead crane conveying system is arranged around the production line. The ground transfer apparatus is adopted between the systems, and a roller conveying line is adopted in each system.

The ground transfer apparatus is configured to receive control information from the control system and perform transferring according to the control information.

The ground transfer apparatus is configured to convey the indoor heat exchanger to the indoor unit production system, convey the outdoor heat exchanger to the outdoor unit production system, convey the outdoor unit and the indoor unit to the packaging system, and convey the complete unit packaged by the packaging system to the complete unit storage system.

In some embodiments, the ground transfer apparatus is universal, and transferring between any two systems can be performed by the ground transfer apparatus.

In some embodiments, each ground transfer apparatus is responsible for transferring between two systems. The ground transfer apparatuses include a first ground transfer apparatus between the heat exchanger universal production system and the indoor unit production system, a second ground transfer apparatus between the heat exchanger universal production system and the outdoor unit production system, a third ground transfer apparatus between the indoor unit production system and the packaging system, a fourth ground transfer apparatus between the outdoor unit production system and the packaging system, and a fifth ground transfer apparatus between the packaging system and the complete unit storage system.

In some embodiments, the production unit includes a production unit state detection device.

The production unit state detection device is configured to detect running state information of production unit devices.

The control system is configured to detect or predict device faults according to the running state information, and send out warning information to inform maintenance personnel to perform maintenance when the device faults are judged or predicted, so as to ensure that the device runs without abnormity.

In some embodiments, the sub-control system detects or predicts device faults according to the running state information. When the device faults are detected or predicted, the sub-control system informs the control system, and the control system sends out warning information to inform maintenance personnel to perform maintenance, so as to ensure that the device runs without abnormity.

In some embodiments, the production unit state detection device includes a temperature sensor, a pressure sensor, a vibration sensor, a humidity sensor, an air tightness sensor, a piezoresistance sensor, or the like.

In some embodiments, the production unit includes a unit lighting device, and the unit lighting device is in a normally-off state, so that a large amount of energy can be saved, and energy consumption of the production system is greatly reduced.

The unit lighting device is located on each production unit and lights the corresponding production unit when turned on.

The control system is configured to control the unit lighting devices corresponding to the production units to be turned on when the faults of the production units are detected or predicted, so that maintenance of maintenance personnel is facilitated.

Some embodiments of the present application also provide an air-conditioner full-automatic intelligent production method. The method includes:

acquiring air conditioner demand information;

determining a production flow according to the air conditioner demand information; and controlling working states of the heat exchanger universal production system, the indoor unit production system and the outdoor unit production system according to the production flow; where when the production flow is used for producing the outdoor unit, controlling the outdoor heat exchanger fin production unit, the universal production unit and the bending unit to produce the outdoor heat exchanger, and controlling the outdoor unit production system to produce the outdoor unit; when the production flow is used for producing the indoor unit, controlling the indoor heat exchanger fin production unit and the universal production unit to produce the indoor heat exchanger, and controlling the indoor unit production system to produce the indoor unit.

In the aforementioned method, production processes can be dynamically determined based on air conditioning demand information, enabling production lines to adapt to various production scenarios, reducing idle time across production units, and enhancing the efficiency and resource utilization of the production system.

In some embodiments, a required number of the indoor units and a required number of the outdoor units corresponding to air conditioner models to be produced are determined according to the air conditioner demand information, and a number n of the indoor heat exchangers continuously produced is determined, where a production flow includes:

controlling the heat exchanger universal production system to firstly produce one outdoor heat exchanger for the outdoor unit production system and then produce n indoor heat exchangers for the indoor unit production system;

when a number of the indoor units reaches the required number of the indoor units and a number of the outdoor units does not reach the required number of the outdoor units, the production flow is changed to control the heat exchanger universal production system to produce the outdoor heat exchangers for the outdoor unit production system;

when the number of the outdoor units reaches the required number of the outdoor units and the number of the indoor units does not reach the required number of the indoor units, the production flow is changed to control the heat exchanger universal production system to produce the indoor heat exchangers for the indoor unit production system, and n is a natural number.

The above control method reduces the energy consumption increase caused by a no-load state of the production line, facilitates inbound and outbound, and improves the management efficiency.

In some embodiments, the number n of the indoor heat exchangers continuously produced is a number n of indoor units included in one air conditioning system.

In some embodiments, the number n of the indoor heat exchangers continuously produced is determined by:

determining a time t3 for producing the indoor units and a time t4 for producing the outdoor units according to the air conditioner model to be produced, dividing the time t4 for the outdoor units by the time t3 for the indoor units, rounding the result, and taking the obtained value as n.

In some embodiments, when the production flow is used for producing the outdoor heat exchanger, the outdoor heat exchanger fin production unit is controlled to produce the outdoor heat exchanger fins, the pipe bending unit of the universal production unit cuts pipes through the first cutting station, the running frequency of the pipe expansion unit of the universal production unit is the first frequency, and the bending unit bends the unbent outdoor heat exchanger;

when the production flow is used for producing the indoor heat exchanger, the indoor heat exchanger fin production unit is controlled to produce the indoor heat exchanger fins, the pipe bending unit of the universal production unit cuts pipes through the second cutting station, the running frequency of the pipe expansion unit of the universal production unit is the second frequency, and the bending unit does not work; and a length of the pipe cut by the first cutting station is a length of an outdoor heat exchanger pipe, a length of the pipe cut by the second cutting station is a length of an indoor heat exchanger pipe, and the second frequency is lower than the first frequency.

Referring to FIG. 30, in some embodiments, the air-conditioner full-automatic intelligent production method includes the following steps.

In step S1, air conditioner demand information is acquired.

In step S2, a production flow is determined according to the air conditioner demand information.

The production flow includes a production flow of the heat exchanger universal production system. In some embodiments, n indoor heat exchangers are produced after one outdoor heat exchanger is produced, and then, n indoor heat exchangers are produced after one outdoor heat exchanger is produced, the process is repeated, and the production flow is changed after the number of the indoor units or the number of the outdoor units reaches the required number.

When the number of the indoor units reaches the required number of the indoor units and the number of the outdoor units does not reach the required number of the outdoor units, the production flow is changed to control the heat exchanger universal production system to produce the outdoor heat exchangers for the outdoor unit production system until the number of the outdoor units reaches the required number.

When the number of the outdoor units reaches the required number of the outdoor units and the number of the indoor units does not reach the required number of the indoor units, the production flow is changed to control the heat exchanger universal production system to produce the indoor heat exchangers for the indoor unit production system until the number of the indoor units reaches the required number of the indoor units.

In step S3, the conveying system conveys materials.

In step S4, when the outdoor unit is determined to be produced according to the production flow, the process proceeds to S5, otherwise, it proceeds to S9.

In step S5, materials are sequentially fed and the outdoor heat exchanger is produced according to the production processes of the outdoor heat exchanger.

In step S6, AGV transfers the outdoor heat exchanger to the outdoor unit production system, and materials are sequentially fed and the outdoor unit is produced according to the production processes of the outdoor unit.

In step S7, AGV transfers the outdoor unit to the packaging system, and packaging materials of the outdoor unit are sequentially fed and the outdoor unit is packaged according to the packaging process.

In step S8, AGV transfers the packaged outdoor unit to the complete unit storage system.

The process proceeds to S4.

In step S9, materials are sequentially fed and the indoor heat exchanger is produced according to the production processes of the indoor heat exchanger.

In step S10, AGV transfers the indoor heat exchanger to the indoor unit production system, and materials are sequentially fed and the indoor unit is produced according to the production processes of the indoor unit.

In step S11, AGV transfers the indoor unit to the packaging system, and packaging materials of the indoor unit are sequentially fed and the indoor unit is packaged according to the packaging process.

In step S12, AGV transfers the packaged indoor unit to the complete unit storage system.

The process proceeds to S4.

The various aspects and features described and illustrated in the specification may be applied separately where possible and such separate aspects may be the subject of divisional applications.

In the foregoing description of the embodiments, the particular features, structures, materials, or characteristics may be combined in any suitable manner in any one or more embodiments or examples.

The foregoing descriptions are merely specific embodiments of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A heat exchanger production line, comprising:

support frame;

a fin conveying line mounted on the support frame, wherein at least a fin storing-fetching station, an end plate mounting station, a pipe inserting station, and a nitrogen charging station are arranged along a conveying direction of the fin conveying line;

a fin storing-fetching device located at one end of the fin conveying line, wherein the fin storing-fetching device comprises:

a storing-fetching bracket having a storage space formed therein;

a bottom plate horizontally arranged in the storage space of the storing-fetching bracket, wherein the bottom plate comprises a plurality of fin stacking pins vertically arranged on the bottom plate, and a first end of each fin stacking pin is fixed on the bottom plate;

a lifting support plate arranged parallel to and above the bottom plate, wherein the lifting support is configured to reciprocate along a height direction of the storing-fetching bracket; a plurality of through holes are formed in the lifting support plate, the plurality of fin stacking pins respectively pass through the plurality of through holes, and a second end of each fin stacking pin extends out of a side of the lifting support plate away from the bottom plate, wherein each fin stacking pin is configured such that: when a plurality of fins fall into the storage space, the second end of the fin stacking pin is inserted into an insertion hole of a corresponding fin, wherein the fins strung in series by fin stacking pin form one fin stack; and a feeding robot configured to transfer the fin stack from the lifting support plate to the fin storing-fetching station when the lifting support plate lifts the fin stack to a target height; wherein the feeding robot comprises:

a feeding robot body; and a feeding clamp arranged on the feeding robot body, wherein the feeding clamp comprises: a clamping power member, and a first feeding clamping member and a second feeding clamping member that are symmetrically arranged; the clamping power member is configured to control a distance between the first feeding clamping member and the second feeding clamping member; wherein the first feeding clamping member comprises a first feeding clamping jaw, the second feeding clamping member comprises a second feeding clamping jaw, a first positioning recess with an opening facing the second feeding clamping jaw is formed on the first feeding clamping jaw, a second positioning recess with an opening facing the first feeding clamping jaw is formed on the second feeding clamping jaw; when first feeding clamping jaw and the second feeding clamping jaw clamp the fin stack under an action of the clamping power member, two ends of a positioning pin inserted in the fin stack are respectively inserted into the first positioning recess and the second positioning recess; wherein the positioning pin is inserted into an insertion port of each fin in the fin stack by a positioning pin inserting robot after the fin stack is formed; after the positioning pin passes through the insertion port of each fin in the fin stack, a first end of the positioning pin is supported on the lifting support plate, and a second end of the positioning pin is exposed above the fin stack, so that the first end of the positioning pin and the second end of the positioning pin are capable of being clamped in the first positioning recess and the second positioning recess, respectively;

an end plate mounting device corresponding to the end plate mounting station, wherein the end plate mounting device is configured to mount end plate members to both ends of the fin stack after the fin conveying line conveys the fin stack from the fin storing-fetching station to the end plate mounting station; wherein the end plate mounting device comprises at least two end plate mounting robots, which are symmetrically arranged on both sides of the fin conveying line, and each end plate mounting robot comprises:

an end plate mounting robot body;

a connecting beam mounted on the end plate mounting robot body, wherein a clamping power member is provided in the connecting beam, and a first telescopic end and a second telescopic end are formed on two ends of the clamping power member, respectively;

two end plate clamps respectively provided on the first telescopic end and the second telescopic end, wherein the two end plate clamps are configured to move towards or away from each other under an action of the clamping power member to clamp or release the end plate member; and a pushing member mounted on the connecting beam, wherein the pushing member is configured to push the end plate member clamped in the end plate clamps to mount the end plate member to the fin stack;

a pipe inserting device corresponding to the pipe inserting station, wherein the pipe inserting device comprises a pipe inserting robot, the pipe inserting robot is configured to insert a pipe member into the fin stack after the end plate member is mounted and the fin conveying line conveys the fin stack to the pipe inserting station; wherein the pipe inserting robot comprises a pipe inserting robot body and a pipe inserting clamp, the pipe inserting clamp is connected to the pipe inserting robot body and comprises two spaced pipe inserting assemblies; each of the pipe inserting assemblies comprises a middle connecting portion and at least one pipe gripper arranged on the middle connecting portion; the pipe inserting device grips the pipe member through the pipe gripper and inserts the pipe member into the fin stack under driving of the pipe inserting robot body; and a nitrogen charging device corresponding to the nitrogen charging station, wherein the nitrogen charging device comprises a nitrogen charging apparatus, a nitrogen charging docking member, and a nitrogen charging robot, wherein the nitrogen charging robot is configured to clamp the nitrogen charging docking member to dock the nitrogen charging docking member with the pipe member of the fin stack, and the nitrogen charging apparatus charges nitrogen into the pipe member through the nitrogen charging docking member.

2. The heat exchanger production line according to claim 1, wherein a support protrusion extends upwards from the lifting support plate, and the support protrusion is configured to support each of the fin stacks so that a clamping gap is formed between a bottom of the fin stack and the lifting support plate.

3. The heat exchanger production line according to claim 2, wherein the first feeding clamping jaw and the second feeding clamping jaw are respectively connected to the clamping power member through an adapter plate;

a first positioning clamping plate perpendicular to the adapter plate is formed on the first feeding clamping jaw, and the first positioning recess with the opening facing the second feeding jaw is formed on the first positioning clamping plate; and a second positioning clamping plate perpendicular to the adapter plate is formed on the second feeding clamping jaw, and the second positioning recess with the opening facing the first feeding clamping jaw is formed on the second positioning clamping plate.

4. The heat exchanger production line according to claim 3, wherein a guiding inclined surface is formed at an end of the second positioning clamping plate, and the guiding inclined surface is configured to guide the first end of the positioning pin into the second positioning recess during movement of the second feeding clamping jaw to the clamping gap.

5. The heat exchanger production line according to claim 3, wherein the first feeding clamping jaw further comprises a first connecting plate, the first connecting plate is arranged perpendicular to the first positioning clamping plate, and the first positioning clamping plate is detachably connected to the adapter plate through the first connecting plate; and the second feeding clamping jaw further comprises a second connecting plate, the second connecting plate is arranged perpendicular to the second positioning clamping plate, and the second positioning clamping plate is detachably connected to the adapter plate through the second connecting plate.

6. The heat exchanger production line according to claim 5, wherein the second connecting plate extends away from the first connecting plate and beyond an edge of the adapter plate.

7. The heat exchanger production line according to claim 1, wherein the fin conveying line comprises a plurality of rollers arranged at intervals along a conveying direction;

the fin conveying line further comprises a supporting plate thereon, the feeding robot is configured to place the fin stack on the supporting plate such that the positioning pin in the fin stack is parallel to a width direction of the fin conveying line and parallel to the supporting plate, and the fin conveying line conveys the fin stack along a running direction of the fin conveying line via the supporting plate.

8. The heat exchanger production line according to claim 7, wherein the end plate mounting device comprises a lifting stopper, the lifting stopper comprises a lifting driving member and a stopping portion, the lifting driving member is arranged below the end plate mounting station, the stopping portion is connected to an output end of the lifting driving member, and the stopping portion is configured to lift and lower between adjacent rollers under an action of the lifting driving member.

9. The heat exchanger production line according to claim 8, wherein the stopping portion comprises at least two stopping blocks arranged at intervals along an axial direction of the roller, and the lifting driving member is configured to drive the at least two stopping blocks to rise to a position above the roller to stop the supporting plate when the supporting plate is transported to the end plate mounting station.

10. The heat exchanger production line according to claim 9, wherein the end plate mounting device comprises a jacking member located upstream of the lifting stopper, and the jacking member comprises:

a jacking block driving member arranged below the fin conveying line; and a jacking block connected to an output end of the jacking block driving member;

wherein the jacking block is lifted and lowered between adjacent rollers to lift the supporting plate to a target height under an action of the jacking block driving member.

11. The heat exchanger production line according to claim 1, wherein each of the pipe grippers comprises a gripper driving member and gripper tips;

a first telescopic end and a second telescopic end are formed on the gripper driving member, and a number of the gripper tips is two, and the two gripper tips are respectively mounted on the first telescopic end and the second telescopic end; and a gripper recess is formed on each of the gripper tips, and the pipe member is configured to be clamped in a gripper position formed by the two gripper recesses.

12. The heat exchanger production line according to claim 1, wherein the nitrogen charging apparatus is arranged in a nitrogen charging room, the nitrogen charging room is mounted on the nitrogen charging station, the nitrogen charging room is provided with a mounting opening, the nitrogen charging pipe extends from the mounting opening to the outside of the nitrogen charging room, and the nitrogen charging docking member is connected to the nitrogen charging pipe.

13. The heat exchanger production line according to claim 12, wherein an elastic member is provided between the nitrogen charging pipe and the nitrogen charging room, one end of the elastic member is fixed to a side wall of the nitrogen charging room, and the other end of the elastic member is connected to the nitrogen charging pipe in the nitrogen charging room;

the elastic member is deformed when the nitrogen charging pipe is moved outwards to be docked with the pipe member; and when nitrogen charging is completed and the nitrogen charging robot releases the nitrogen charging pipe, the elastic member drives the nitrogen charging pipe to reset under an action of an elastic restoring force.

14. The heat exchanger production line according to claim 12, wherein the nitrogen charging pipe is provided with an elastic pipe section.

15. The heat exchanger production line according to claim 1, wherein the nitrogen charging robot comprises:

a nitrogen charging robot body; and a nitrogen charging clamp mounted on the nitrogen charging robot body;

wherein the nitrogen charging clamp comprises a clamping driving member and a clamping jaw assembly connected to the clamping driving member, the clamping jaw assembly comprises a first clamping jaw and a second clamping jaw symmetrically arranged, the first clamping jaw and the second clamping jaw are each formed with a clamping recess, and the clamping recesses are configured to clamp the nitrogen charging pipe.

16. The heat exchanger production line according to claim 15, wherein a docking channel is formed on the nitrogen charging docking member, the docking channel is gradually expanded away from the nitrogen charging pipe, and the docking channel is communicated with the nitrogen charging pipe.

17. The heat exchanger production line according to claim 1, wherein the fin conveying line comprises an upstream conveying line and a downstream conveying line;

the upstream conveying line comprises a plurality of rollers arranged at intervals along a conveying direction of the upstream conveying line;

the downstream conveying line comprises a conveying driving member and a conveyor belt;

the end plate mounting station and the pipe inserting station are located on the upstream conveyor line, and the nitrogen charging station is located on the downstream conveying line;

a pipe expanding device and a drying device are provided between the upstream conveying line and the downstream conveying line, and the fin stack is transported between the upstream conveying line and the pipe expanding device, between the pipe expanding device and the drying device, and between the drying device and the downstream conveying line by a transfer robot.

18. The heat exchanger production line according to claim 17, wherein the transfer robot comprises a transfer robot body and a transfer clamp mounted on the transfer robot body;

the transfer clamp comprises a transfer beam, a transfer driving member and two transfer clamping plates, wherein the transfer beam is connected to the transfer robot body, the transfer driving member is mounted on the transfer beam, a first telescopic end and a second telescopic end are formed on the transfer driving member, the two transfer clamping plates are respectively arranged on the first telescopic end and the second telescopic end, and the transfer clamping plates are configured to clamp the end plate members at both ends of the fin stack.

\* \* \* \* \*